United States Patent [19]

Kazuharu

[11] Patent Number: 4,685,702

[45] Date of Patent: Aug. 11, 1987

[54] LABEL PRINTER

[75] Inventor: Teraoka Kazuharu, Tokyo, Japan

[73] Assignee: Teraoka Seikosho Co., Ltd., Tokyo, Japan

[21] Appl. No.: 808,677

[22] Filed: Dec. 16, 1985

Related U.S. Application Data

[60] Continuation of Ser. No. 529,643, Sep. 6, 1983, abandoned, which is a division of Ser. No. 238,104, Feb. 25, 1981, abandoned.

[30] Foreign Application Priority Data

| | | |
|---|---|---|
| Feb. 26, 1980 [JP] | Japan | 55-23260 |
| Feb. 26, 1980 [JP] | Japan | 55-23261 |
| Feb. 28, 1980 [JP] | Japan | 55-24604 |
| Jul. 3, 1980 [JP] | Japan | 55-91077 |
| Jul. 4, 1980 [JP] | Japan | 55-91294 |
| Jul. 14, 1980 [JP] | Japan | 55-98296 |
| Sep. 6, 1980 [JP] | Japan | 55-123835 |
| Sep. 6, 1980 [JP] | Japan | 55-127050 |

[51] Int. Cl.⁴ .................................. B42D 15/00
[52] U.S. Cl. .................................. 283/81; 235/375
[58] Field of Search ................ 283/1 R, 81; 235/375

[56] References Cited

U.S. PATENT DOCUMENTS

| | | | |
|---|---|---|---|
| 3,902,262 | 9/1975 | Colegrove et al. | 283/91 X |
| 4,117,975 | 10/1978 | Gunn | 235/375 |
| 4,260,656 | 4/1981 | Mullen | 283/81 X |

Primary Examiner—Paul A. Bell
Attorney, Agent, or Firm—Birch, Stewart, Kolasch & Birch

[57] ABSTRACT

A label printer prints article name together with required data such as weight, rate, price on a label adhered to products or packed products, or the label printer prints only the article name. Improved input means for article name, display means, date setting means for preparation date, check means for print head, label position detecting means in printing unit and memory adding means are disclosed.

11 Claims, 48 Drawing Figures

| 品名 | 豚肩肉スライス　　（薄切） | 2a |
| 賞味期限 55.3.10 | 寺岡精肉店 | |
| 加工年月日 55.3.5 | 100g当り(円) 150 | 正味量(g) 199 | 値段(円) 298 |

2

| ARTICLE | BEEF STEAK | 2a |
| RELISH TERM 55.3.10 | TERAOKA MEAT SHOP | |
| PROCESSED DATE 55.3.5 | PRICE PER 100g(¥) 150 | NET WEIGHT(g) 199 | PRICE(¥) 298 |

| KEYWORD | CHINESE CHARAC-TER | PRONUN-CIATION | ENGLISH TRANS-LATION | KEYWORD | JAPANESE KANA CHARACTER | PRONUN-CIATION | KEYWORD | ALPHA-BET | KEYWORD | SYMBOL |
|---|---|---|---|---|---|---|---|---|---|---|
| 1001 | 豚 | BUTA | PORK | 2001 | ア | a | 3001 | A | 4001 | ( |
| 1002 | 牛 | USI | BEEF | 2002 | イ | i | 3002 | B | 4002 | ) |
| 1003 | 鶏 | TORI | CHICKEN | 2003 | ウ | u | 3003 | C | 4003 | — |
| 1004 | 肉 | NIKU | MEET | 2004 | エ | e | 3004 | D | 4004 | ✳ |
| 1005 | 肩 | KATA | SHOULDER | 2005 | オ | o | 3005 | E | 4005 | . |
| 1006 | 薄 | USU | THIN | 2006 | カ | Ka | 3006 | F | 4006 | 1 |
| 1007 | 切 | KIRI | SLICE | 2007 | キ | Ki | 3007 | G | 4007 | 2 |
| 1008 | : | : |  | 2008 | ク | Ku | 3008 | H | 4008 | 3 |
| 1009 | : | : |  | 2009 | ケ | Ke | 3009 | I | 4009 | 4 |
| 1010 | : | : |  | 2010 | コ | Ko | 3010 | J | 4010 | 5 |
| 1011 | : | : |  | 2011 | サ | Sa | 3011 | K | 4011 | : |
| 1012 | : | : |  | 2012 | シ | Si | 3012 | L | 4012 | : |
| 1013 | : | : |  | 2013 | ス | Su | 3013 | M | 4013 | : |
| 1014 | : | : |  | 2014 | セ | Se | 3014 | N | 4014 | : |
| 1015 | : | : |  | 2015 | ソ | So | 3015 | O | 4015 | : |
| 1016 | : | : |  | 2016 | タ | Ta | 3016 | P | 4016 | : |
| 1017 | : | : |  | 2017 | チ | Ti | 3017 | Q | 4017 | : |
| 1018 | : | : |  | 2018 | ツ | Tu | 3018 | R | 4018 | : |
| 1019 | : | : |  | 2019 | テ | Te | 3019 | S | 4019 | : |
| 1020 | : | : |  | 2020 | ト | To | 3020 | T | 4020 | : |
| 1021 | : | : |  | 2021 | ナ | Na | 3021 | U | 4021 | : |
| 1022 | : | : |  | 2022 | ニ | Ni | 3022 | V | 4022 | : |
| 1023 | : | : |  | 2023 | ヌ | Nu | 3023 | W | 4023 | : |
| 1024 | : | : |  | 2024 | ネ | Ne | 3024 | X | 4024 | : |
| 1025 | : | : |  | 2025 | ノ | No | 3025 | Y | 4025 | : |
| 1026 | : | : |  | 2026 | ハ | Ha | 3026 | Z | 4026 | : |
| 1027 | : | : |  | 2027 | ヒ | Hi | 3027 | : | 4027 | : |
| 1028 | : | : |  | 2028 | フ | Hu | 3028 | : | 4028 | : |
| 1029 | : | : |  | 2029 | ヘ | He | 3029 | : | 4029 | : |
| 1030 | : | : |  | 2030 | ホ | Ho | 3030 | : | 4030 | : |
| 1031 | : | : |  | 2031 | マ | Ma | 3031 | : | 4031 | : |
| 1032 | : | : |  | 2032 | ミ | Mi | 3032 | : | 4032 | : |
| 1033 | : | : |  | 2033 | ム | Mu | 3033 | : | 4033 | : |
| 1034 | : | : |  | 2034 | メ | Me | 3034 | : | 4034 | : |
| 1035 | : | : |  | 2035 | モ | Mo | 3035 | : | 4035 | : |
| 1036 | : | : |  | 2036 | ヤ | Ya | 3036 | : | 4036 | : |
| 1037 | : | : |  | 2037 | ユ | Yu | 3037 | : | 4037 | : |
| 1038 | : | : |  | 2038 | ヨ | Yo | 3038 | : | 4038 | : |
| 1039 | : | : |  | 2039 | ラ | Ra | 3039 | : | 4039 | : |
| 1040 | : | : |  | 2040 | リ | Ri | 3040 | : | 4040 | : |
| 1041 | : | : |  | 2041 | ル | Ru | 3041 | : | 4041 | : |
| 1042 | : | : |  | 2042 | レ | Re | 3042 | : | 4042 | : |
| 1043 | : | : |  | 2043 | ロ | Ro | 3043 | : | 4043 | : |
| 1044 | : | : |  | 2044 | ワ | Wa | 3044 | : | 4044 | : |
| 1045 | : | : |  | 2045 | ン | n | 3045 | : | 4045 | : |

| ARTICLE NAME CODE | CONTENT | | | | | | | | | | |
|---|---|---|---|---|---|---|---|---|---|---|---|
| 001 | 1001 | 1005 | 1004 | 2013 | 2039 | 2002 | 2013 | 4001 | 1006 | 1007 | 4002 |
| 002 | 1002 | 2027 | 2007 | 1004 | | | | | | | |
| 003 | 3002 | 3005 | 3005 | 3006 | 3019 | 3020 | 3005 | 3001 | 3011 | | |
| 004 | | | | | | | | | | | |

豚肩肉スライス(薄切)
BUTAKATANIKU SURAISU (USUKIRI)
SLICED PORK SHOULDER

牛ヒキ肉
USIHIKINIKU
MINCED BEAF

BEEF STEAK

FIG. 8

| PHRASE KEYWORD | CONTENT | | | | | | | | PHRASE | (PRONUNCIATION) ENGLISH TRANSLATION |
|---|---|---|---|---|---|---|---|---|---|---|
| 9001 | 1005 | 1004 | | | | | | | 肩肉 | (KATANIKU) SHOULDER |
| 9002 | 2011 | 4003 | 2045 | 2002 | 2076 | | | | サーロイン | (SAROIN) SIRLOIN |
| 9003 | 2027 | 2044 | | | | | | | ヒレ | (HIRE) FILLET |
| 9101 | 2012 | 2017 | 2038 | 4003 | | | | | シチュー | (SITYU) STEW |
| 9102 | 1008 | 2012 | 1009 | 2007 | | | | | 蒸ッ焼キ | (MUSIYAKI) FOR BRAISING |
| 9103 | 1009 | 1004 | | | | | | | 焼肉 | (YAKINIKU) FOR FRYING |
| 9201 | 2027 | 2007 | 1004 | | | | | | ヒキ肉 | (HIKINIKU) MINCED MEAT |
| 9202 | 1010 | 2018 | 2007 | | | | | | 骨ツキ | (HONETUKI) BONE IN |
| 9203 | 2013 | 2039 | 2002 | 2013 | 4001 | 1006 | 1007 | 4002 | スライス(薄切) | (SURAISU(USUKIRI)) SLICE (THIN SLICED) |
| 9301 | 3002 | 3005 | 3005 | 3006 | | | | | BEEF | |
| 9302 | 3019 | 3020 | 3005 | 3001 | 3011 | | | | STEAK | |
| 9303 | --- | --- | --- | | | | | | --- | --- |

FIG. 9
| ARTICLE NAME CODE | CONTENT | | | | | | | | | |
|---|---|---|---|---|---|---|---|---|---|---|
| 001 | 1001 | 9001 | 9203 | | | | | | | |
| 002 | 1002 | 9201 | | | | | | | | |
| 003 | 9301 | 9302 | | | | | | | | |
| | | | | | | | | | | |
豚肩肉スライス(薄切)
BUTAKATANIKU SURAISU (USUKIRI)
SLICED PORK SHOULDER
牛ヒキ肉
USIHIKINIKU
MINCED BEAF
BEEF STEAK
FIG. 10
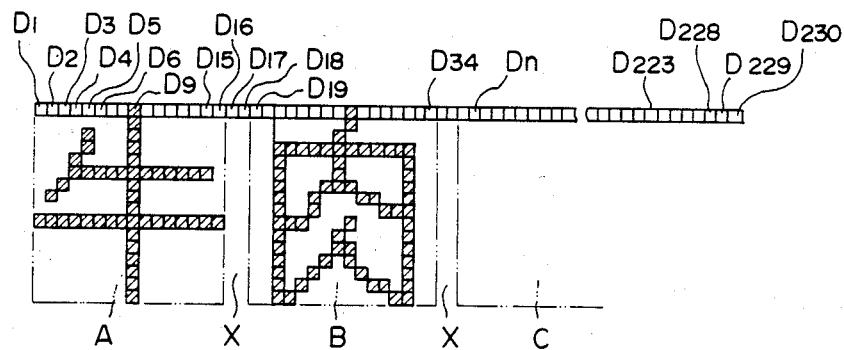
FIG. 11
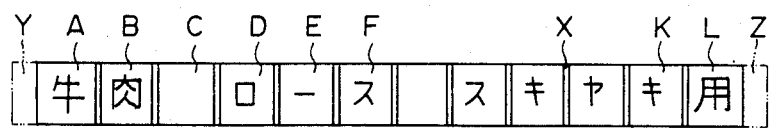

LABEL PRINTER

This application is a continuation of application Ser. No. 529,643 filed on Sept. 6, 1983, now abandoned, which was a divisional of application Ser. No. 238,104 filed Feb. 25, 1981, now abandoned.

BACKGROUND OF THE INVENTION

1. Field of the Invention

The present invention relates to a label printer. More specifically, the invention relates to a label printer which prints article name together with data such as weight, rate, price, preparation date, effective date, tare, article number and bar code on a label to be applied to products or packaged products. Otherwise only article name is printed on it. It is used in connection or installation with electronic balances such as a weight balance, a digital balance or a price indicating balance and a packing machine with price indication in supermarkets or it is used separately.

2. Description of the Prior Art

In conventional label printers, impact print system is adopted where printing is carried out by application of impact to a printing surface using a magnet, a hammer or the like. When characters of an article name are to be applied to a label made by such printers, separate printing means such as a rubber stamp or printers with different types of characters must be used. Such printers therefore are disadvantageous in that (1) when articles of a new name are sold a new rubber stamp must be used, (2) hands may be soiled by ink, and (3) supply of ink is required and the maintenance work is troublesome.

In order to eliminate above mentioned disadvantages, various printers of dot print type without impact print have been recently developed, which have the advantages that the treatment is simple, the maintenance is not troublesome, and any characters or symbols may be printed.

Conventional label printers have display field for weight, rate, price of articles but not display field for article names.

In conventional label printers, preparation date of articles as well as effective date (date after which product is no longer in the case of foods) must be printed by previously setting the dates using corresponding dial switches. Setting of date must be renewed every day. If the date renewal were forgotten carelessly, an unfavorable condition would occur in that really fresh articles would appear to purchasers to be old.

In conventional label printers, use of printers of heat senitive type, electric discharge type, wire dot type, ink jet type or the like is proposed where characters or symbols are designated by a number of dots. When printing is carried out on a label using such printers, required characters, numerals, symbols or bar codes are printed with the print head and the label in relative motion, for example, the label is logitudinally moved with respect to the laterally aligned print head. When one print heads, e.g. that printing a bar code on a label, does not work, omission of print in a corresponding portion may cause false designation of codes or other information. Such wrong operation of a print head cannot be discovered readily. In the case of bar code, for example, the wrong operation cannot be determined until values read in the bar code reader are compared.

In order to check operation of each print head, all print heads are simultaneously operated and printing is carried out throughout the whole label surface. If omission of printing occurs in any portion during the above mentioned operation, the portion corresponding to the omission remains the color of the original paper thereby wrong operation of a print head is determined. When the above mentioned checking method is applied to printers such as a thermal printer with a number of print heads arranged in a lateral line, however, since power supply capacity for heating is set (rated) corresponding to part (e.g. a half) of all print heads so as to make the printer compact, particular power supply capacity for the checking inevitably makes the printer larger.

In conventional label printers, the control system is generally provided with accumulator memory in which weight, price, number or the like of articles are summed and accumulated per article item.

In such label printers, however, when a label is not properly held in a label holder on account of wrong operation of the label feed or when feeding operation is carried out at wrong article code, the label is printed with undesired data. Efficiency of princing operation in this state is decreased because additional work is necessary to detect the undesired data and to correct the wrong data.

In conventional label printers generally, labels are applied to a label carrying paper formed in a band and spaced at prescribed intervals along it. The label carrying paper is moved intermittently in a certain direction and stopped at a prescribed position opposite to the print head for printing. When the label travel length is specified only as a stroke length, the stopping position is shifted at occurrence of a slip in the label feeding whereby information is not printed at a specified position of the label.

In conventional practice, a label position detecting unit is installed at the moving path of labels to detect the label position. By stopping the label feeding when the detecting unit detects the label to proper position, each label is printed securely at a prescribed position.

Above mentioned conventional label position detecting unit is composed of a detector comprising a light emitting element and a light receiving element, and of a comparator comparing the detector output voltage with the previously set reference voltage and determining from the voltage difference either the label is at the detecting position of the detector. The light emitting and receiving elements are opposite to each other and the label carrying paper is interposed between both elements. As labels are conveyed, light from the light emitting element is received by the light receiving element through only carrying paper or through both the carrying paper and the label. The reference voltage is set to a prescribed voltage between the high output voltage of the detector during detection of the label applied gap and the low output voltage during detection of the label using electric resistance division or programming method.

Since change of the label carrying paper in material and thickness changes the light permeability, the reference voltage must be set every time when the label is changed or a new label carrying paper is used. Omission of the renewal setting of the reference voltage may cause the frequent occurrence of defective labels and the wrong operation of printers. Accordingly, improvement in this respect has been desired.

SUMMARY OF THE INVENTION

An object of this invention is to provide a label printer wherein printing is effected in dot print process and article name is supplied to a printing unit and printed on a label in character pattern assigned by item keywords.

When a plurality of characters of an article name are printed using the above mentioned label printer, one character corresponds to one keyword stored in a memory. Accordingly, constitution of a sentence of 10 characters requires the keying operation corresponding to 10 keywords. Thus the input operation is so troublesome that above mentioned advantages cannot be utilized.

A second object of this invention is therefore to simplify the input operation of a label printer and utilize advantages of non-impact type printers, by preparing keywords of phrases of article names to be printed on a label and effecting the operation in the keywords of phrases.

A third object of this invention is to issue a label which is balanced, easily readable and versatile by a dot print process, by previously setting required number of characters and lines in the item column of the label and adjusting the character interval or partly omitting a character when an aritcle name to be printed is more or less in number than the set number of characters and lines.

A fourth object of this invention is to issue a label with advertisement function, by further adjusting the character interval and printing the article name in the item column together with previously specified additional characters.

Article names to be printed on the label using the label printer sometimes have primarily common words, for example, "CHICKEN STEAK BEEF CHUCK" and "CHICKEN STEAK TOP CHUCK". If the change from one printed name to the other is effected by clearing all characters and setting new characters, the operation is troublesome and inefficient and may cause mistake.

A fifth object of this invention is to make the item storage setting operation simple and efficient and to reduce errors by identifying characters displayed in the item column of the label printer and retaining the common words and clearing only the words which will change for the subsequent setting operation.

A sixth object of this invention is to improve workability and accuracy of a label printer, by making the correcting operation easy when one or more characters of article name are stored in error.

When a new article is inputted to the label printer, item code designating the new article name must be set and then keys corresponding to the article name to be printed must be operated by pushing in sequence. Since there are a number of keys corresponding to the article name to be printed, the setting operation of the article name takes time and may cause mistake.

A seventh object of this invention is to make the article name input operation easy and to eliminate errors by utilizing the bar code corresponding to article name and storing in memory the item key code and character key code obtained as a result of reading the bar code in the code reader.

An eighth object of this invention is to provide a display field for indicating item characters stored in the memory during printing, thereby the characters are indicated in the display field and any error can be readily found.

In label printers, data relating to article name, rate, effective term or the like are previously written in a preset memory by the input operation. Conventional label printers are disadvantageous in that capacity of non-written portion of the memory cannot be known during the writing in the preset memory.

A ninth object of this invention is to indicate the capacity of non-written portion of the preset memory in the display field throughout the writing in the preset memory, thereby the operator can identify the capacity and workability is improved.

A tenth object of this invention is to provide a label printer which contains date display and clock, thereby an accurate preparation date is always printed on the label.

An eleventh object of this invention is to simplify the setting operation of an expiration date by setting the preparation date and an expiration term and calculating the expiration date automatically corresponding to the expiration term and printing the expiration date.

A twelfth object of this invention is to provide a pattern checking method which can simply and accurately detect wrong operation of the print head used in the printing unit of the label printer.

A thirteenth object of this invention is to provide a label which enables the simple checking of the print head at any time.

A fourteenth object of this invention is to prevent an accumulating memory contained in the label printer from summing unrequired data and to improve accuracy of values of total weight, summed price and number of pieces accumulated in the memory.

A fifteenth object of this invention is to provide a label feed system which can stop the label accurately at the printing position during the printing operation of the label printer and to eliminate erroneous labels.

BRIEF DESCRIPTION OF THE DRAWINGS

FIG. 5 is a diagram illustrating comparison of characters or symbols with item keywords;

FIG. 8 is a diagram illustrating comparison of phrase keywords with character keywords;

FIG. 9 is a diagram illustrating comparison of item codes with keywords;

FIG. 10 is a diagram illustrating printing mode;

FIG. 11 is a diagram illustrating the distribution of printing characters corresponding to required number;

DESCRIPTION OF THE PREFERRED EMBODIMENTS

A label printer in the present invention adopts dot print process which includes heat-sensitive type, ink jet type, electro-static recording type, electrophotographic type, wire dot type or the like. Of these, the heat-sensitive type is the most suitable for the label printer. Therefore following description is directed to application of the heat-sensitive type dot print process.

Figures 1, 2A, 2B:
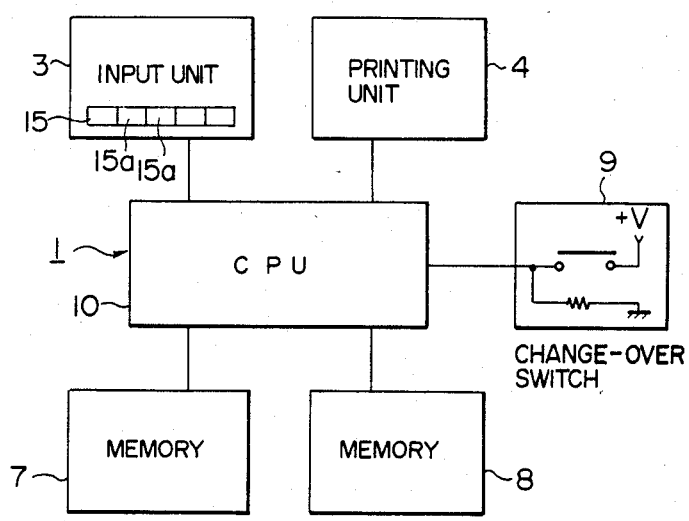
FIG. 1 is a block diagram of a label printer according to this invention.
FIG. 2(a) and FIG. 2(b) are plan views of examples of printed labels.
Figure 3:
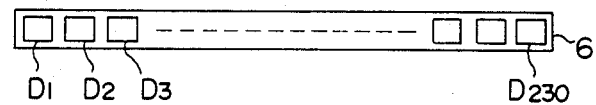
FIG. 3 is a front view illustrating constitution of a print head.

FIG. 1 is a block diagram of a label printer 1, and FIGS. 2(a) and (b) are plan views of examples of labels 2 printed using the label printer 1. Characters describing an article printed using the printer 1 are designated at an item column 2a of the label 2. Referring to FIG. 1, an input unit 3 comprises ten numeral keys, a function key or the like and is operated to input item codes or item keywords. A printing unit 4 is a "heat-sensitive printer" and prints characters designated at the item column 2a in FIG. 2. The printing unit 4 is provided with a print head 6 as shown in FIG. 3. The print head 6, composed of a number of heating elements $D_1, D_2, D_3 \ldots$ (230 heating elements in this embodiment) arranged in a lateral line, is transferred in the longitudinal direction at 16 steps. A first memory 7 is a ROM (read only memory) where a number of character patterns are previously stored.

Figure 4:
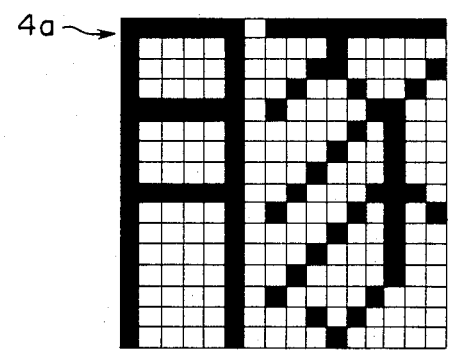
FIG. 4 is an enlarged plan view of an example of character pattern.

Character designating process used in this embodiment will be explained. In this embodiment, one character or symbol is displayed by character pattern composed of 16×16 bits. For example, "BUTA" in Chinese character (English meaning "pork") is shown in FIG. 4. Referring to FIG. 5, various characters or symbols are assigned to article name keywords. Numerals starting from 1000 are assigned to Chinese characters (Punctuation and English translation are added for ready understanding of meaning. Punctuation is discussed below, numerals starting from 2000 to Japanese "kana" (punctuation set forth), numerals starting from 3000 to alphabetical characters, and numerals starting from 4000 to symbols and numerals. Chinese characters or symbols are disclosed in this embodiment. Other foreign characters may be used if necessary. The number of heating elements $D_1$–$D_{230}$ (230 pieces) and character pattern size (16×16 bits) in the printing unit 4 are specified presuming the use of characters including Chinese characters and may be reduced in the case of English characters for example.

The memory 7 stores character patterns such as shown in FIG. 4 corresponding to item keywords in FIG. 5. If item keywords are addressed and supplied as signals to the memory 7, character pattern corresponding to the item keywords is read out.

Figures 6, 7:
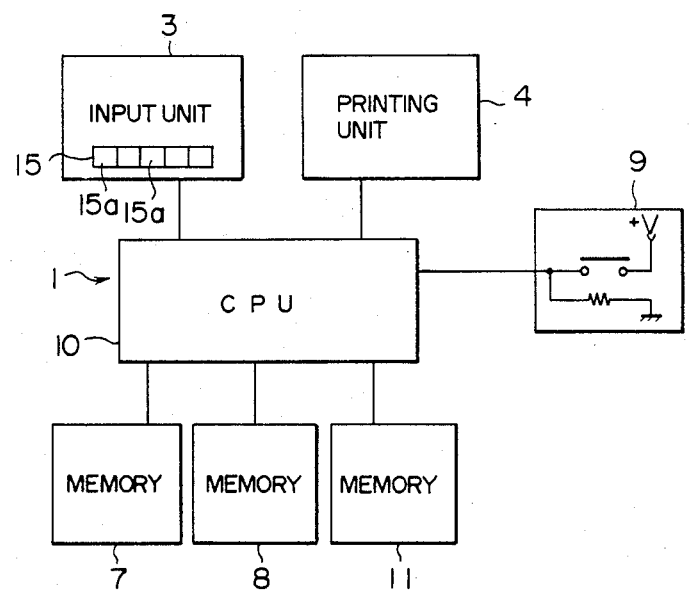
FIG. 6 is a diagram illustrating an example of item code—item keyword comparison table.
FIG. 7 is a block diagram of modified embodiment of label printer.

A second memory 8 is a RAM (random access memory) for storing "item code-item keyword comparison table" in FIG. 6. Item codes are specified corresponding to items such as "BUTAKATANIKUSURAISU(USUKIRI)" (English meaning pork shoulder fillet) or "USIHIKINIKU" (English meaning: minced beef). In this embodiment, item code "001" is assigned to "BUTAKATANIKUSURAISU(USUKIRI)", code "002" to "USIHIKINIKU", code "003" to English article name "BEEF STEAK" and so on. In the table of FIG. 6, characters or symbols constituting the article names are listed by item keywords in order. The memory 8 stores item keywords corresponding to characters of item codes in address specified by the item codes.

A change-over switch 9 (changing means) designates write/read operation in the memory 9. A control system (hereinafter referred to as "CPU") 10 controls the above mentioned units and usually comprises a micro computer.

Operation of the label printer 1 in FIG. 1 is now to be described mainly regarding the CPU 10.

In the label printer 1, an operator initially stores the information in the table of FIG. 6 in the memory 8 whereby article name is automatically printed on the label 2 by inputting the item code using the input unit 3 at the time of sale. The preparation of the table of FIG. 6 in the memory 8 will be first described.

The change-over switch 9 is turned "ON" (first state) and then item code "001" is entered by the input unit 3. The item code "001" passes through the CPU 10 and is supplied as address signal to the memory 8, and address "001" of the memory 8 is in write ready state. If item keywords of FIG. 6 such as "BUTAKATANIKUSURAISU (USUKIRI)", "1001", "1005", "1004", "2013", "2039", "2002", "2013", "4001", "1006", "1007" and "4002", are entered in order by the input device 3, the item keywords are written in address "001" of the memory 8.

If item code "002" is inputted and then item keyboards "1002", "2027", "2007" and "1004" are entered in order, corresponding keywords "USIHIKINIKU"

are written in address "002" of the memory 8. If item code "003" is inputted and then item keywords "3002", "3005", "3005", "3006", "3019", "3020", "3005", "3001" and "3011" are entered, corresponding item keywords "BEEF STEAK" are written in address "003". By repeating this procedure, item code "1004" and so on may be inputted with required item keywords, thus the table of FIG. 6 is prepared. Since the comparison table of characters or symbols with item keywords in FIG. 5 was previously prepared, an operator can enter item keywords referring to this table.

Printing operation of an article name to the label 2 will be described. The change-over switch 9 is turned "OFF" (second state) and then item code "001", for example, is entered by the input unit 3. The item code "001" passes through the CPU 10 and is supplied as address signal to the memory 8, thereby content of address "001" in the memory 8, that is, item key code corresponding to characters of "BUTAKATANIKUSURAISU(USUKIRI)" is supplied to the CPU 10. The item key code read in the CPU 10 is supplied as address signal to the memory 7. Thereby character pattern corresponding to the supplied key code is supplied to the CPU 10. First line of character pattern read in the CPU 10 (for example, that designated by reference numeral 4a in FIG. 4) is supplied to the printing unit 4. Of heating elements $D_1$, $D_2$, $D_3$ . . . of the print head 6 in the printing unit 4, those required for dot display of the first line are supplied with signals and heated, thereby dot display of the first line of character pattern is effected. Subsequently, the print head 6 is moved downwards by one step and the second line is ready for dot display. In turn, the CPU 10 supplies the lines 2, 3, . . . 16 of character pattern to the printing unit 4, thus "BUTAKATANIKUSURAISU (USUKIRI)" read from address "001" of the memory 8 is printed to the item column 2a of the label 2 (FIG. 2(a)).

If item code "002" is entered by the input unit 3, characters corresponding to item keywords stored in address "002" of the memory 8, that is, characters "USIHIKINIKU" are printed to the label 2. If item code "003" is entered by the input unit 3, characters "BEEF STEAK" stored in address "003" are printed to the label 2 (FIG. 2(b)). If item code "004" is entered by the input unit 3, characters or symbols corresponding to item keywords stored in address "004" of the memory 8 are printed.

Although the print head 6 is moved throughout 16 steps in the sequence of the above description alternatively, the label 2 may be moved in sequence.

The memory 8 may store item keywords together with rate, tare, expiration day or other matters pertaining to the item, thereby when the item code is entered by the input unit 3 the CPU 10 can read out the item keyword as well as rate, tare, expiration day or the like simultaneously.

Although the item code-item keyword comparison table in FIG. 6 is prepared by keying operation of the input unit 3, it may be stored in an auxiliary memory such as a cassette tape and then transferred to the memory 8 through the CPU 10 or directly to memory 8.

FIG. 7 shows constitution of the above mentioned label printer 1 further accompanied by a third memory 11 storing phrase keywords.

In FIG. 7, the second memory 8 stores "item code-character keyword table" in FIG. 6 as well as "phrase keyword-character keyword comparison table" in FIG. 8.

Referring to FIG. 8, the third memory 11 is a ROM which previously stores phrase keywords comprised of combinations of character keywords as in FIG. 5. The phrase keywords are assigned corresponding to phrases (combination of characters, numerals, symbols etc.) which are frequently printed to labels.

Examples of phrase keywords corresponding to phrases which are frequently used in the item column 2a of FIG. 2 are as follows: Those showing sorts of meat, such as "KATANIKU", "SAROIN", "HIRE" in Chinese or "kana" character, and "BEEF", "STEAK" in English, those showing the cooking, such as "SITIU-", "MUSIYAKI", "YAKINIKU"; and those showing the state of meat, such as "HIKINIKU", "HONETUKI".

When an operator prepares "table of FIG. 9 in the memory 8, the change-over switch is turned "ON" and item code "001" is entered by the input unit 3. In this state, if keywords "1001", "9001" and "9003" are entered in order by the input unit 3, content of item keyword "BUTAKATANIKUSURAISU (USUKIRI)" is written in address "001" of the memory 8. If item code "002" is entered and then keywords "1002" and "9201" are entered in order, item keyword "USIHIKINIKU" is written in address "002" of the memory 8. If item code "003" is entered and then keywords "9301" and "9302" are entered, item keywords "BEEF STEAK" is written in address "003" of the memory 8. Thus item keywords are readily written in the memory 8 using above mentioned operation.

When an aritcle name is printed to the label 2, the change-over switch 9 is turned "OFF" and item code "001", for example, is entered by the input unit 3. The item code "001" passes through the CPU 10 and is supplied as address signal to the memory 8, thereby content in address "001" of the memory 8, i.e. keywords "1001", "9001", "9203" are read in the CPU 10. Of the keywords read in the CPU 10, those other than character keywords, i.e. phrase keywords "9001" and "9203" are supplied to the memory 11. Content of address "9001", "9203" in the memory 11, i.e. character keywords "1005", "1004", "2013", "2041", "2002", "2013", "4001", "1006", "1007", "4002" are read in the CPU 10. The character keywords read in the CPU 10 are supplied as address signal to the memory 7, thus "BUTAKATANIKUSURAISU(USUKIRI)" is printed to the item coloum 2a of the label 2.

Referring to FIGS. 10-14, the method of setting printing intervals or spacing of item characters to be printed in the item column 2a of the label will be explained. In the embodiment, characters to be printed in the item column 2a are designated as A, B, C . . . , and each displayed using a dot matrix of 16 by 16 pieces. Heating elements $D_1$–$D_{230}$ of 230 pieces are arranged in a lateral line, and portions of the heating elements $D_1$–$D_{230}$ corresponding to characters A, B, C . . . are heated and colored by heat pulse. Which dot of the dot matrix should be heated is set by the central processing unit (hereinafter referred to as "CPU") contained in the label printer. Thereby characters A, B, C . . . are printed and gap x corresponding to two dots (for example, $D_{17}$ and $D_{18}$) is provided between characters A, B, C . . . .

Arrangement of characters A, B, C . . . will be shown in FIG. 10 as an example. When the 230 heating elements $D_1$–$D_{230}$ are used, maximum available number of characters (hereinafter referred to as "required number of characters") becomes 12 according to following calculation: $(230+2) \div (16+2) = 12.888$. If the left end character A is displayed using the heating elements $D_1$–$D_{16}$ as shown in FIG. 10, the heating elements $D_{215}$–$D_{230}$ of 16 pieces at the right of the twelfth character L remain unused. If less than 12 characters, for example 8, are printed from the heating element $D_1$ as shown in FIG. 10, since number of dots required to print 8 characters is $16 \times 8 + (8-1) \times 2 = 142$, the heating 88 elements $D_{143}$–$D_{230}$ remain unused to the right of the eighth character H. The arrangement of all 8 characters towards the left makes an undesirable appearance.

Accordingly, in order to adjust the gap X between characters depending upon the number of characters, this invention uses following three methods. A first method is in that the required number of characters corresponding to number of the heating elements is previously set by the CPU 10 and if the number of characters to be printed is less than the required number, the gap x is adjusted to suitable length. A second method is in that when number of characters to be printed is more than the required number a part of the arrangement of characters is omitted. A third method is in that when a plurality of printing lines are used and the number of lines to be printed is more than the required number a part of the perpendicular direction to the character arrangement is omitted.

The first method will be described in detail. If number of dots in character arrangement direction on item column of the label is Td, number of characters N, number of dots in character arrangement direction required to write one character "a", number of dots corresponding to gap X between adjacent characters "x", residual gap at front end (left end) of character arrangement direction $K_1$, and residual gap at rear end $K_2$, the relation is represented in following equation.

$$Td = aN + x(N-1) + (K_1 + K_2) \quad (1)$$

Assume that $K_1$, $K_2$ are positive and $K_2$ is equal to $K_1$ or more than $K_1$ by one dot, then the relation is as follows.

$$K_2 \geq K_1 \geq 0 \quad (2)$$

$$1 \geq (K_2 - K_1) \geq 0 \quad (3)$$

When number of characters N varies, a, $K_1$, $K_2$ are determined.

(EXAMPLE 1)

This is described referring to FIG. 11. In FIG. 10, the required number of characters N is determined to be 12 at $Td = 230$, $a = 16$, $x = 2$. On the contrary, x, $K_1$, $K_2$ shall be specified, when $N = 12$ and $x = K_1 + K_2$. Modifying the equation (1), $$Td = aN + x(N-1) + x \quad (4)$$

$$= aN + xN$$

$$x = \frac{Td - aN}{N} \quad (5)$$

$$= \frac{230 - 16 \times 12}{12}$$

$$= 3.16666$$

Therefore $x = 3$ is specified and the fraction after the decimal point is distributed in $K_1$ and $K_2$. Modifying the equation (1), $$K_1 + K_2 = Td - aN - x(N-1) \quad (6)$$

$$= 230 - 16 \times 12 - 3(12-1)$$

$$= 5$$

Thus $K_1 = 2$, $K_2 = 3$ may be specified, thereby gap X between characters A–N, margin Y at the left side of character A, and margin Z at the right side of character L are determined.

(EXAMPLE 2)

Figure 12:
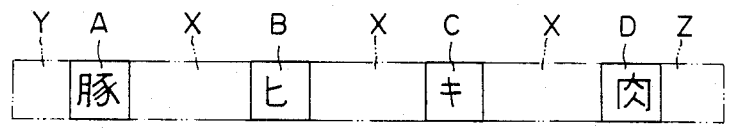
FIG. 12 is a diagram illustrating the printing of fewer characters than required.

Referring to FIG. 12, description is effected when number of item characters is 4. According to the equation (5), $$x = \frac{230 - 16 \times 4}{4}$$

$$= 41.5$$

Therefore $x = 41$ is specified and $K_1$, $K_2$ are specified from the equation (6) as follows.

$$K_1 + K_2 = 230 - 16 \times 4 - 41(4-1)$$

$$= 43$$

Thus $K_1 = 21$, $K_2 = 22$ may be specified, thereby balanced distribution of characters is effected as shown in FIG. 12.

The second method will be described as already described referring to FIG. 10, when the 230 heating elements $D_1$–$D_{230}$ are used and number of dots required to write one character is 16 and number of dots corresponding to gap X between characters A–L is 2, chamber of characters to be printed becomes 12 or less. The second method provides remedy for printing more than 12 items and increases the number of printing characters N by making a, x in the equation (1) as small as possible. For example, character A of FIG. 10 "US1" in Chinese character can be read "US1" even if display of the heating elements $D_1$, $D_2$, $D_{15}$, $D_{16}$ is omitted in the lateral direction. Accordingly, when number of characters to be printed in the item column is more than the required number of characters, modifying the equation (4), range of number of characters to be printed is determined according following equation, $$N = \frac{Td}{(a - Co) + x} \quad (7)$$

wherein Co is number of dots to be omitted.

(EXAMPLE 3)

Figure 13:
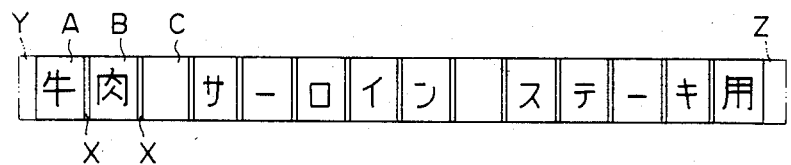
FIG. 13 is a diagram illustrating the printing of more characters than required.

Referring to FIG. 13, description is effected when number of item characters is 14. Modifying the equation (7), $$(a - Co) + x \frac{Td}{N} \quad (8)$$

$$(a - Co) = \frac{Td}{N} - x$$

Provided that Td=230, x=1, N=14, $$a - Co = \frac{230}{14} - 1$$

$$= 15.428571$$

Therefore one dot in either left or right end of each character is omitted, and one character is displayed by 15 dots. Values of $K_1$, $K_2$ are specified according to the equation (6) as follows.

$$K_1 + K_2 = 230 - 15 \times 14 - (14 - 1)$$

$$= 7$$

Thus $K_1=3$, $K_2=4$ may be specified, thereby the display is effected as shown in FIG. 13.

(EXAMPLE 4)

When a character can be read properly even at omission of 4 dots, 2 with the right and 2 at the left, such as "USI", "NIKU" in Chinese character of FIG. 10, maximum number of characters which can be displayed on the item column is calculated according to the equation (7) as follows.

$$N = \frac{230}{(16 - 4) + 1}$$

$$= 17.692$$

Therefore the maximum number becomes 17 and $K_1=5$, $K_2=5$ may be specified.

The third method will be explained. If number of dots in the vertical or perpendicular direction to the character arrangement on item column of the label is Te, number of lines P, number of dots in perpendicular direction to the character arrangement required to write one character "b", number of dots corresponding to gap n between lines "r", number of dots corresponding to margin at the upper end $S_1$, and number of dots corresponding to margin at the lower end $S_2$, the relation is represented in following equation.

$$Te = bP + r(P-1) + (S_1 + S_2) \quad (8)$$

(EXAMPLE 5)

Provided that Te=41, b=16 (see FIG. 10), maximum number of lines becomes 2. According to the equation (8)

$$r(P - 1) + (S_1 + S_2) = Te - bP = 41 - 16 \times 2 = 9$$

$$r(2 - 1) + S_1 + S_2 = 9$$

$$r + S_1 + S_2 = 9$$

Figure 14:
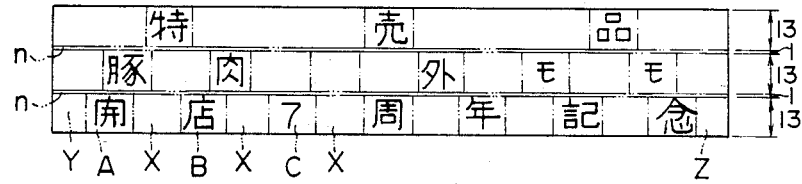
FIG. 14 is a diagram illustrating the printing of more lines than required.

Therefore the distribution is effected in r=5, $S_1=2$, $S_2=2$. P in this state is the required number of lines, and the printing is effected in one or two lines. The third method intends to omit a part of upper or lower portion (for example, the lower end) of characters A, B, C . . . arranged laterally such as shown in FIG. 10. In the case of printing more lines than the required number as shown in FIG. 14, modifying the equation (8)

$$bP = Te - r(P - 1) - (S_1 + S_2) \quad (9)$$

-continued $$b = \frac{Te - r(P - 1) - (S_1 + S_2)}{P}$$

Provided that P=3, $S_1=0$, $S_2=0$, Te=41

$$b = \frac{41 - r \times 2}{3} = 13.666 - \frac{2}{3} r$$

Therefore b=13 is specified and the assignment of fraction to the gap between lines results in r=1. Referring to FIG. 14, "TOKUBAIHIN" in Chinese character (English meaning: bargain), "BUTANIKUSOTOMO" (English meaning: pork ham) and "KAITEN 7 SIYU-NENKINEN" (English meaning: 7th anniversary from store opening) are arranged on three lines, and number of dots corresponding to character height is 13 and that of gap between lines is 1. Since characters A, B, C . . . are printed with 13 dots, lower portion of characters is omitted by 3 dots. Japanese words may be read properly even with omission of a part of the lower end (or upper and lower ends) as above described. The third method utilizes such feature of Japanese words (For example, "USINIKU" in FIG. 10 can be read properly even at omission of the lower end by 3 dots.)

In FIGS. 10–14, the heating elements $D_1$–$D_{230}$ of the heat-sensitive printer are arranged in a lateral line and the printing is effected when the heating elements $D_1$–$D_{230}$ or the labels to be printed are moved longitudinally in sequence. However, the method may be applied to a dot printer other than heat-sensitive type and printing during lateral transferring of the print head. Furthermore, the method may be applied to the printing of characters with different size, for example, when size of numerals or "kana" characters is smaller than that of Chinese characters.

Figure 15A:
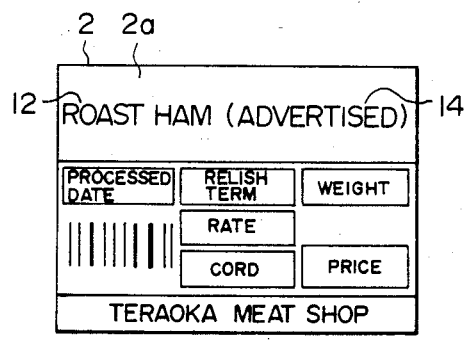
FIG. 15(a) and FIG. 15(b) are plan views of modified examples of labels.
Figure 15B:
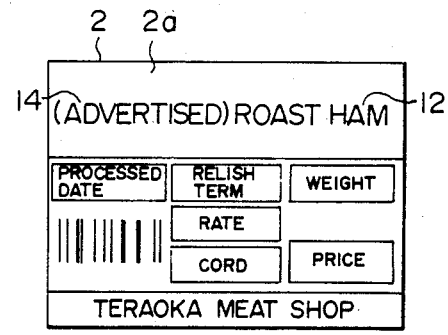

Referring to FIGS. 15(a) and (b), the article name 12 as well as additional characters 14 may be printed on the item column 2a of the label 2.

In order to realize above mentioned printing, an additional character setting means 15 is provided in the input unit 3 of FIG. 1 or FIG. 7 and code corresponding to additional characters (including sentences) in pattern form is inputted to the memory associated with the CPU 10 by operating said means 15.

The additional character setting means 15 selectively operates auxiliary keys 15a with display of sentences such as "recommended today", "advertized", "discounted today", "special discount", "manager's choice", "just in" . . . , thereby code of sentence corresponding to display of the auxiliary key 15a is called from the memory and delivered to the CPU. The code is added to the end of the article name previously set in the CPU and intervals between characters are determined again corresponding to number of characters in the article name and additional sentence, thus "roast ham (advertized)" is printed on the label 2 as shown in FIG. 15(a).

Although the additional sentence 14 is added to the end of the article name 12 in FIG. 15(a), it may be added to the front end of the article name 12. Apart from the auxiliary key 15a of full key type, code type keys in combination with register key and function key may be used as the additional character setting means 15.

Referring to FIGS. 16–21, improved method of item input of the label printer will be explained. The control panel of the label printer is provided with register key, item setting key, item storage means, item clear key and item display field. Article name characters corresponding to the article name calling means are displayed on the item display field and entered and stored in the control unit of the label printer. Above mentioned item characters are separated into blocks per word and any block may be cleared by operation in combination of the register key and the clear key. New word is entered and stored to the cleared block by operation of the item setting key and storage key.

The item setting key is an operation key for inputting and setting article name as a character signal to the control unit. The item setting key inputs article name as item characters in English, "kana" character, Chinese character or combination of those with numerals.

One item setting key may input one word, or one key may input one character as seen in a typewriter in English or "kana" character.

The relation between item character and calling means is as follows. Item code number is designated to each item and item characters corresponding to the code number are inputted. When the code number is keyed by register key at printing, corresponding item characters may be displayed on the display field.

The item storage means may use an independent item storage key or the storage key may be used also as register key or item setting key, or the keys may be operated in sequence.

In the case of item characters "CHICKEN STEAK BEEF CHUCK" as an example, word blocks of item characters are any of "CHICKEN", "STEAK", "BEEF", "CHUCK". The item characters are separated into inputted blocks and only the required block may be cleared.

The word block is constituted by a series of individual characters such as "S", "T", "E", "A", "K". The word block may be separated into individual characters and only the required character of the block may be cleared.

Figure 16:
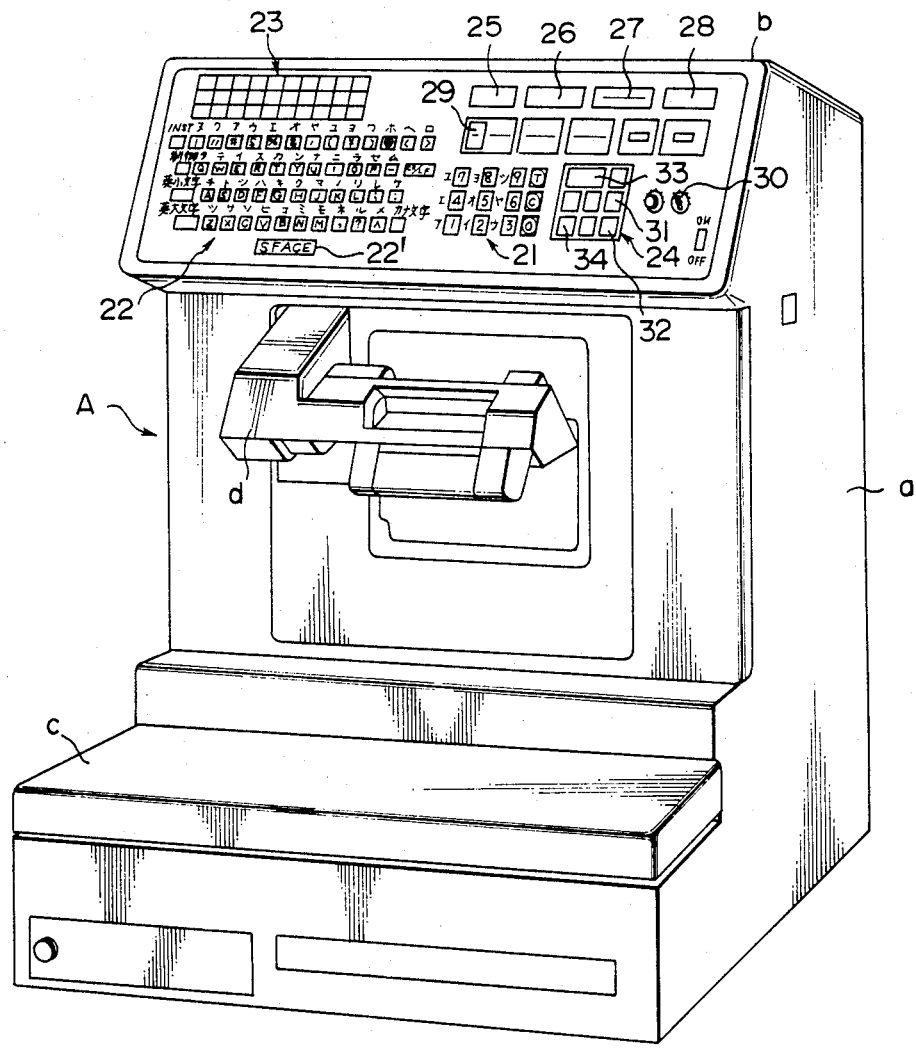
FIG. 16 is a perspective view of another embodiment of label printer.

FIG. 16 shows a label printer A comprising a body "a", a control panel "b", a weight detecting unit "c" and a printing unit "d". The control panel is provided with register keys 21, an item setting key 22, an item display field 23, an operation command key unit 24, a tare display field 25, a rate display field 26, a weight display field 27, a price display field 28, a code display field 29 and a change-over switch 30, each part being connected to control system (a') of the body (a).

The operation command key unit 24 comprises an item storage key 31 as storage means, as item clear key 32, a code input key 33 and a full clear key 34.

The change-over switch 30 is changed to "setting position" where data such as article name, rate, date are entered and stored in the control system (a') or to "register position" where article is weighed and printed automatically.

Register keys 21 comprise ten numeral keys of numerals 1-0 and a clear key.

The item setting key 22 is of English character typewriter form having keys of alphabetical characters (A, B, C . . . ). Each key may be used also for "kana" character, and the register keys 21 may be also utilized at the use as "kana" character typewriter.

In the item setting key 22, of course, independent English character key and "kana" character key may be used. Furthermore a number of item keys with "BEEF" and "BEEF CHUCK" may be used.

The item setting key 22 inputs and stores in the control system (a') item character together with item code number registered in the register keys 21.

When "CHICKEN STEAK BEEF CHUCK", for example, is keyed by the item setting key 22, word blocks are separated by spacing of one column using keying operation of a spacer key 22' between words.

The item setting key 22 may be cleared in every word block using the clear key 32, and individual characters (sub-blocks in one word) of the word block may be cleared per every character using the clear key 32. The clear key 32 is connected to the display field 23 through the control system a'.

Position of blocks of the item character is designated by the register key 21. For example, "CHICKEN STEAK BEEF CHUCK" is designated in positions 1, 2, 3 . . . from the top block in sequence. "CHICKEN" is previously set to register 1 (block 1), "STEAK" to register 2 (block 2),' "BEEF" to register 3 (block 3) and "CHUCK" to register 4 (block 4).

Sub-blocks in one word of item characters are designated in positions 1, 2, 3 . . . from the top character in sequence, so that required character in the block is designated by the register key 21. In order to distinguish the designation of the word block and the sub-block in one word, the space key 22' is operated between both register values.

Character "E" of word "STEAK" is the third character in the block 2. Therefore "E" is designated by operation of register key "2", space key 22', register key "3".

Figure 18:
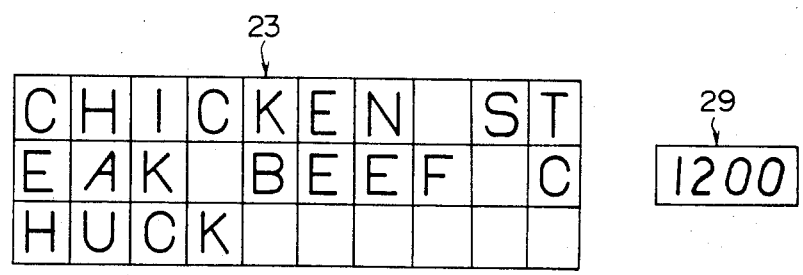
FIGS. 18–21 are plan views of display fields illustrating the item setting method.

When article name of the label printer A is stored and set, the change-over switch 30 is adjusted to "setting position" and required item code number e.g. "1200" is registered by the register key 21. The code command key 33 is pushed and the item storage key with item "CHICKEN STEAK BEEF CHUCK" is pushed by the item setting key 32, thereby signal "1200 CHICKEN STEAK BEEF CHUCK" is stored in the control system a' and at the same time "CHICKEN STEAK BEEF CHUCK" is displayed in the item display field 23 and "1200" is to the code display field 29 (FIG. 18).

Figure 19:
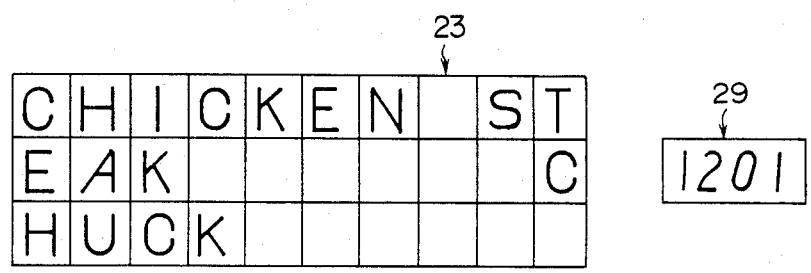
Figure 20:
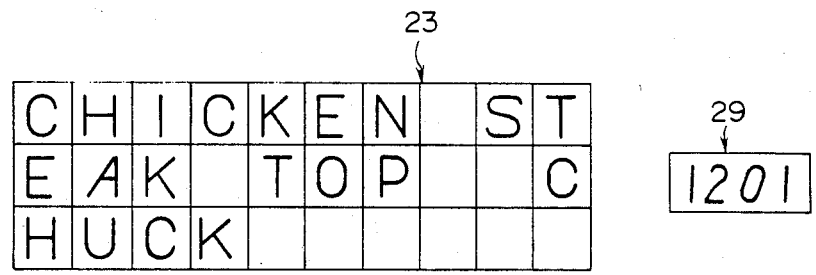

When item "CHICKEN STEAK TOP CHUCK" with code number "1201" is inputted, "1201" is pushed by the register key 21 and the code command key 33 is pushed, and then "3" is registered by the register key 21. Word block of "BEEF" is cleared by pushing the item clear key 32 (FIG. 19). When "TOP" is keyed to the cleared block by the setting key 22 and the item storage key 31 is pushed, signal "1201 CHICKEN STEAK TOP CHUCK" is stored and displayed on the display field 23 and 29 (FIG. 20).

Figure 21:
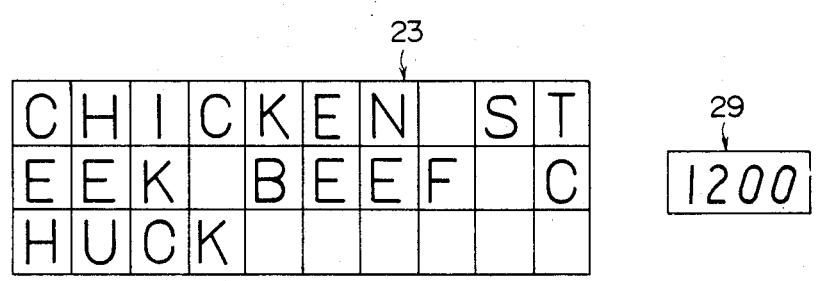

When the keying of "CHICKEN STEAK BEEF CHUCK" using the item setting key 22 becomes "CHICKEN STEAK BEEF CHUCK" by wrong operation (FIG. 21), "2" is registered by the register key 21, the space key 22' is pushed, and "4" is registered by the register key and then the item clear key 32 is pushed, thereby the fourth character of block 2 is cleared into "CHICKEN STE K BEEF CHUCK" (FIG. 21). In this state, when character "A" is keyed by the setting key 22, "A" is inserted to the cleared portion and corrected. In similar manner, a number of item characters together with code number are inputted to the control system a'. The item clear key 32 may be of type using the clear key (c) of the register key 21 as a substitute.

Figure 22:
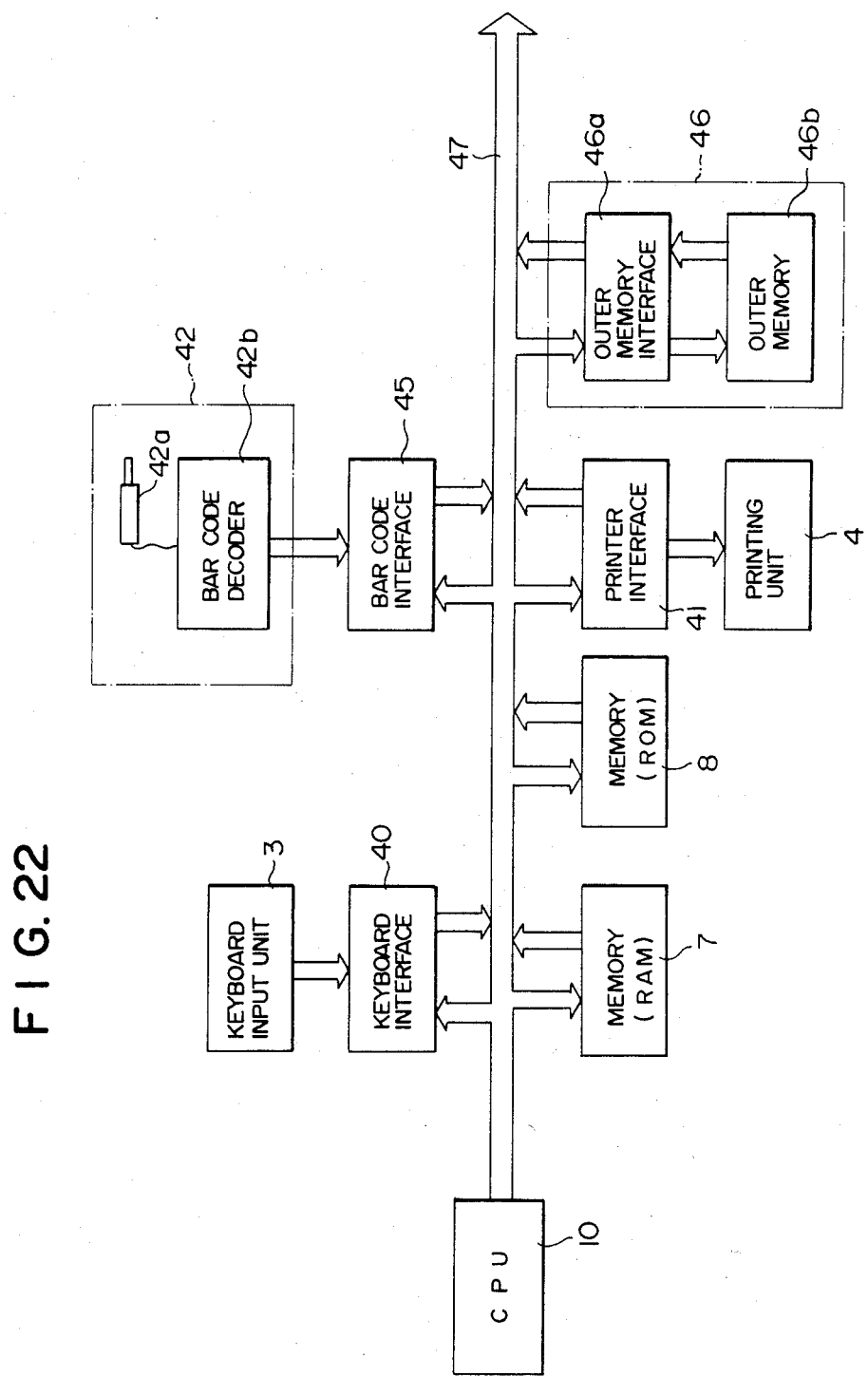
FIG. 22 is a block diagram illustrating a modified example.
Figure 23:
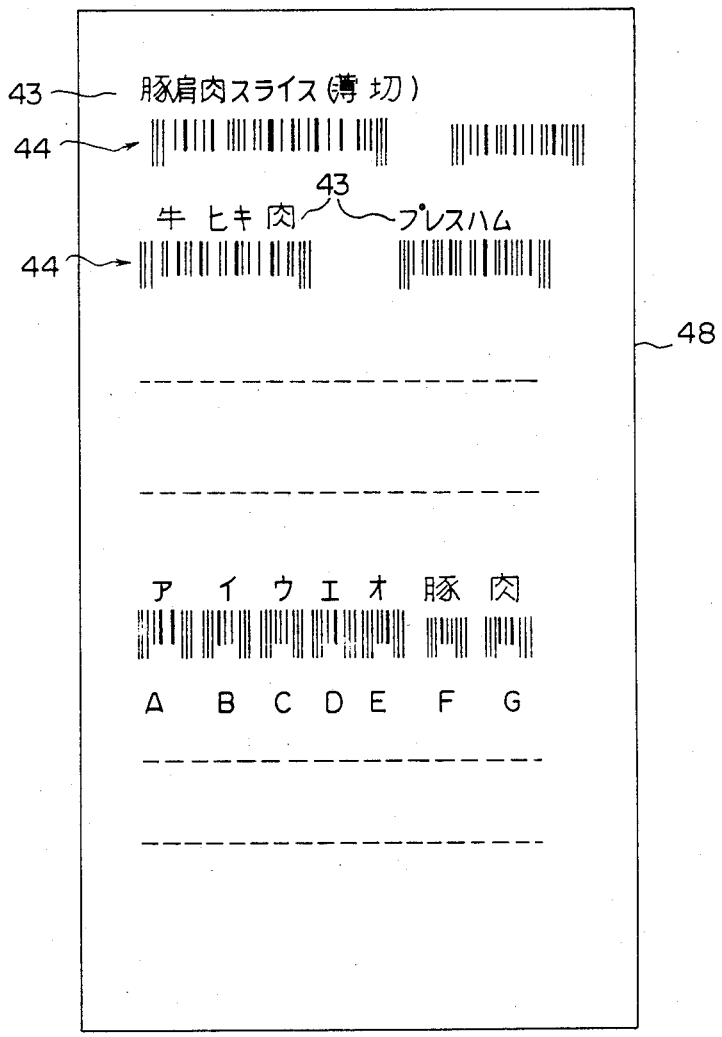
FIG. 23 is a plan view of an example of article name—bar code comparison sheet.

Method of inputting the item keyword to the memory using bar code printed corresponding to article name will be explained in a modified example of FIG. 1. In FIG. 22, numerals 3, 4, 7, 8, 10 designate members having the same function as in FIG. 1 as previously described. In FIG. 22, a keyboard interface 40, composed of key encoder or the like, carries out the delivery of signals between the input unit 3 and various members. A printer interface 41 carries out the delivery of signals between the printing unit 4 and various members. A pen scanner 42a reads out bar code 44 printed corresponding to article name 43 as shown in FIG. 23. A bar code decoder 42b carries out conversion into character key code corresponding to bar code signal supplied from the pen scanner. A bar code reader 42 is composed of the bar code decoder 42b and the pen scanner 42a. The pen scanner 42a and the bar code reader 42 may be detachably connected to the label printer. A bar code interface 45 carries out the delivery of signals between the bar code decoder and various members. An outer or auxiliary memory unit 46 is detachably connected to signal bus 47. The outer memory unit 46 is composed of an outer memory 46a comprising non-volatile memory such as floppy disc (or magnetic tape, paper tape) or IC memory with backup power source, and of an outer memory interface 46b for deliverying signals between the outer memory 46 and various members.

When an operator prepares the table of FIG. 6 in the memory 8, item code "001" is entered by the input unit 3 and then bar code 44 corresponding to item code 43, e.g. "BUTAKATANIKUSURAISU(USUKIRI)" as shown in FIG. 23 is read out by the pen scanner 42a. Thereby corresponding item key codes "1001", "1005", "1004" . . . are written in sequence to address "001" of the memory 8. When the bar code 44 printed on a paper 48 shown in FIG. 23 is read out by the pen scanner 42a, item key codes "1001", "1005" . . . . "1007", "4002" are outputted from the bar code encoder 42b. When item code "002" is entered and then the bar code 44 corresponding to item code "USIHIKINIKU" 43 is read out by the pen scanner 42b, character key codes "1002", "2027" . . . are written in the memory 8. Thus the table of FIG. 6 is prepared in the memory.

Content of the table stored in the memory 8 is transferred to the outer memory unit 46 according to transfer command from the CPU and stored in the outer memory 46a. Thus the outer memory unit 46 stores "item code-item keyword comparison table" of FIG. 6 transferred from the memory 8 and data such as expiration day.

The outer memory unit 46 is disconnected from the signal bus 47 after storing the table, and connected to another printing unit, for example, signal bus 47 of same type printing device used in chain stores, thereby "item code-item keyword comparison table" stored in the outer memory unit 46 is transferred to the memory 8 of the newly connected printing unit. Although data entered from the input device 3 and the pen scanner 42a is stored in the memory 8 and then transferred to the outer memory unit 46 in the embodiment, data from the input unit 3 and the pen scanner 46 may be stored in the outer memory unit 46 directly. A plurality of outer memory units 46 . . . may be connected to the signal bus 47. Furthermore, item code e.g. "001" (or "002" . . . ) can be entered, of course, using bar code shown in FIG. 23. In this case, data input operation may be further readily carried out.

Figure 17:
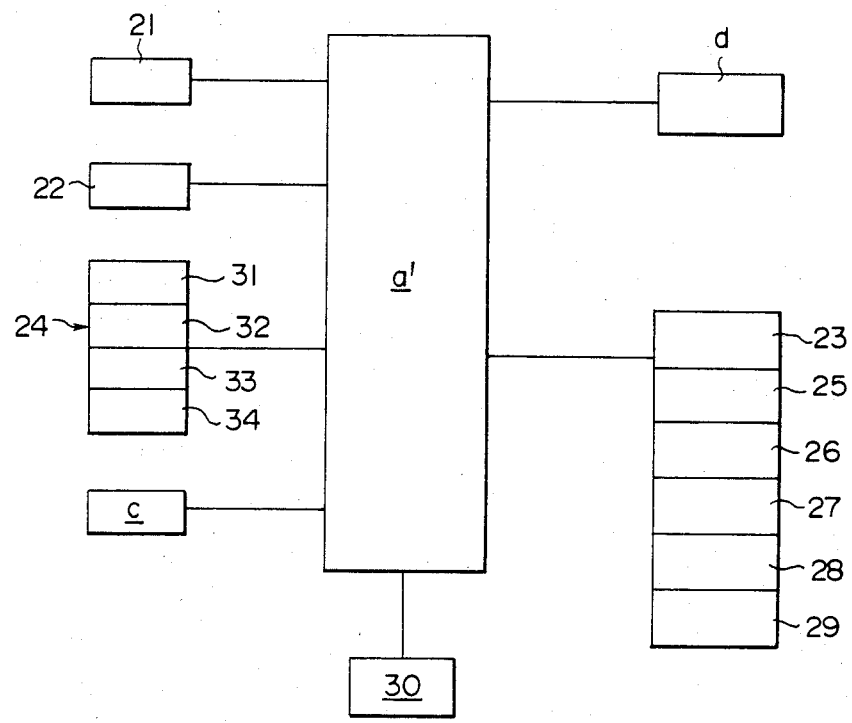
FIG. 17 is a block diagram of the label printer in FIG. 16.

Operation of outputting (calling) the inputted article name will be explained in a label printer shown in FIG. 16 and FIG. 17 with respect to article name "ALL BEEF HAMBURGER" and item code number "5001" as an example.

When item calling operation is effected, the changeover switch 30 is changed to "registration position" and then the command key 24 and the register key 21 are operated. Data such as tare, rate are inputted and the article is disposed on the weight detecting unit (c). The item calling operation can be automatically effected by keying operation of prescribed item code number of the article using the register key 21 after pushing the code command key 33.

For example, if code number "5001" is registered by the register key 21, corresponding item character signal is called by the control unit a' and transmitted to the display field 23. Prescribed item character "ALL BEEF HAMBURGER" is displayed on the display field 23 and detected and then said signal together with data signal such as tare, rate, price is transmitted to the printing unit (d) according to print command signal thereby the printing is effected on the label.

Figure 24:
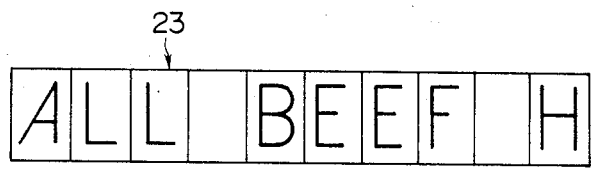
FIGS. 24–26 are diagrams illustrating the item display state during the calling.
Figure 25:
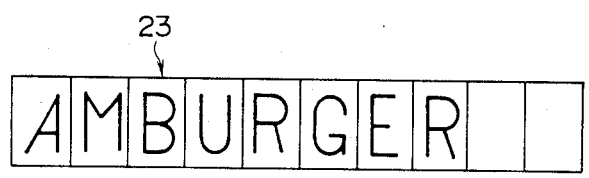
Figure 26:
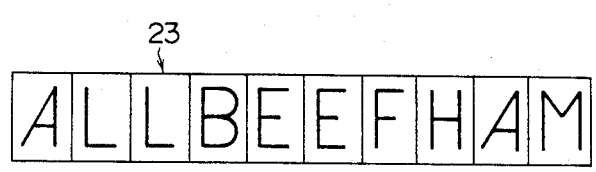
Figure 27:
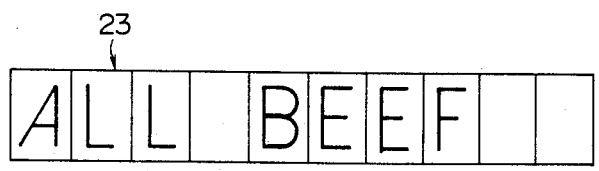
FIG. 27 and FIG. 28 are diagrams illustrating modified example of the item display state.
Figure 28:
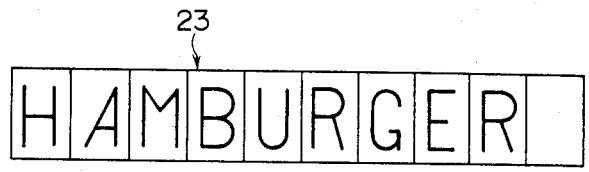

Display on the display field 23 during the calling operation is so effected that all item characters are simultaneously displayed. If number of columns in the display field 23 is insufficient, the display is divided into 2 times or more as shown in FIG. 24 and FIG. 25. In this case, characters "ALL BEEF H" in FIG. 24 are intermittently flashed thereby existence of subsequent display may be confirmed. After the display of characters in FIG. 25, starting portion of item characters is displayed in series within the column such as "ALL-BEEFHAM" shown in FIG. 26. FIG. 27 and FIG. 28 show modified example of FIG. 24 and FIG. 25, wherein always complete words "ALL", "BEEF", "HAMBURGER" are displayed.

In addition to usual weight indicating printing, the item display may be effected in single operation according to prescribed calling operation for checking of the label printer, or it may be effected together with printing operation (test printing) of item characters on the label so that display function of the label printer is checked irrespective of the weight indicating printing.

Figure 29:
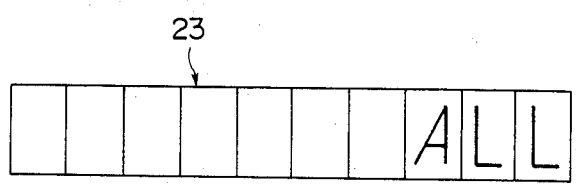
FIGS. 29–31 are diagrams illustrating the item display state during item inputting.
Figure 30:
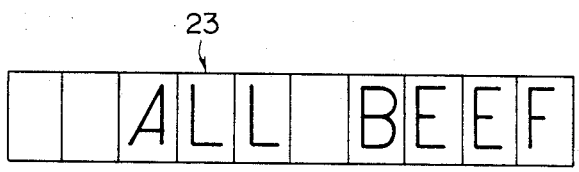
Figure 31:
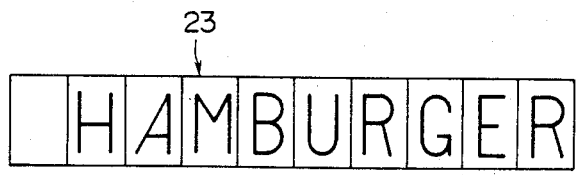

Referring to FIGS. 29-31, item display during input operation may be effected so that the first character of article name, for example, "A" in "ALL . . . " is displayed and shifted across the display field 23.

Figure 32:
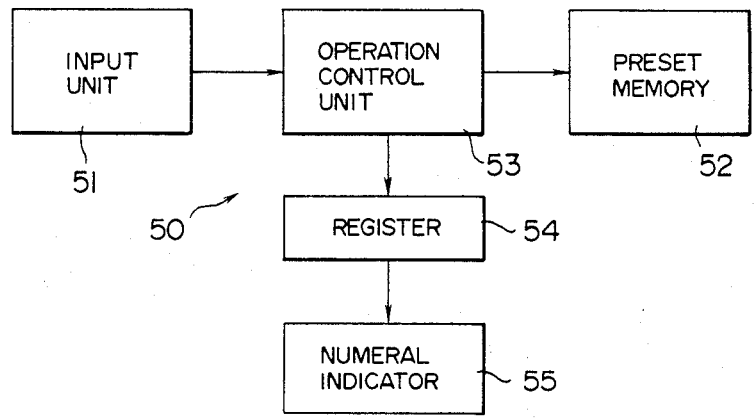
FIG. 32 is a diagram illustrating the data write state in the preset memory.
Figure 33:
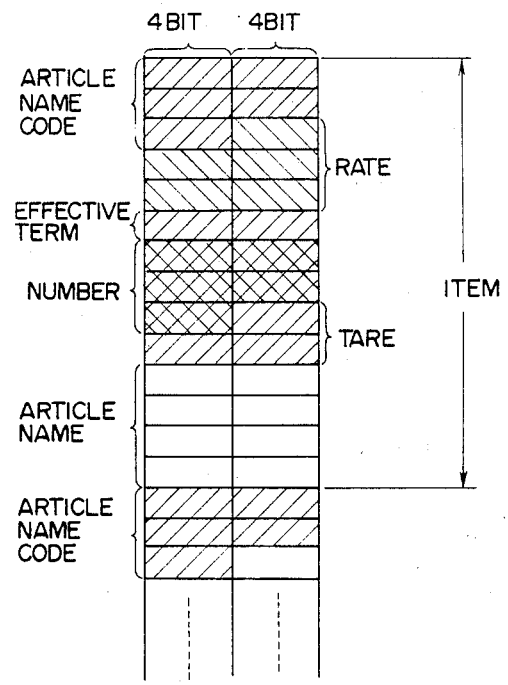
FIG. 33 shows the state of item code in memory.

Referring to FIG. 32 and FIG. 33, a label printer provided with a preset memory and displaying capacity of non-written portion of the preset memory will be described. FIG. 32 is a block diagram illustrating the main part of the label printer 50. Numeral 51 designates an input unit comprising ten numeral keys or the like. The input unit 51 enters data to be written in a preset memory 52, such as item code, rate, expiration term, number of pieces, tare, article name. Data entered by the input unit 51 is supplied to an operation control unit 53. The operation control unit 53 writes data supplied from the input unit in the preset memory 52 in sequence in the mode as shown in FIG. 33. FIG. 33 shows the state of item code written in 5 words (1 word=4 bits), rate data in 5 words, expiration term or term in 2 words, data of number of pieces in 5 words, tare data in 3 words, and article name data in 8 words.

The operation control unit 53 specifies number of words in non-written region of the preset memory 52. The number of words is divided by the prescribed mean item capacity (that is, mean value of number of words constituting items) and the divided result, that is, number of items which can be written is stored in the register 54. The number of items stored in the register 54 is displayed by a numeral indicator 55. The above mentioned item means aggregate of article name data, rate data, effective term respectively set per article name.

Use method of the preset memory 52 in this embodiment will be described.

In conventional manner, the preset memory was used in fixed number of words within the item. Such use method is disadvantageous in that the memory is wasted in smaller number of columns in article name data or the like. Accordingly, this embodiment adopts method of making the number of words within the item variable. In this embodiment, data of relatively invariable length, such as article name code, rate data, tare data, data of effective term are of fixed number of words, while data of varied length corresponding to article name, such as article name data are of variable number of words. Thereby the preset memory 52 can be used more effectively.

Mean item capacity in the embodiment need not be correct mean value of number of words constituting items. Approximate mean value will do.

In place of the numeral indicator 55, a price indicator installed in the label printer may be substituted therefor.

In place of the operation control unit 53, operation circuit installed in the label printer may be substituted therefor.

Writing to the preset memory 52 may be effected by that data specified by the bar code being written by the pen scanner without using ten numeral.

This invention can be applied to the preset memory 52 used at fixed number of words within the item.

This invention can be applied to not only a label printer issuing a label together with weight detecting, but also a label printer issuing a label based on data within the memory without weight detecting function.

Since the operation control unit specifies number of items which can be written in the preset memory and the result is displayed in the numeral indicator, the number of items which can be written may be always known during the writing in the preset memory.

Figure 34:
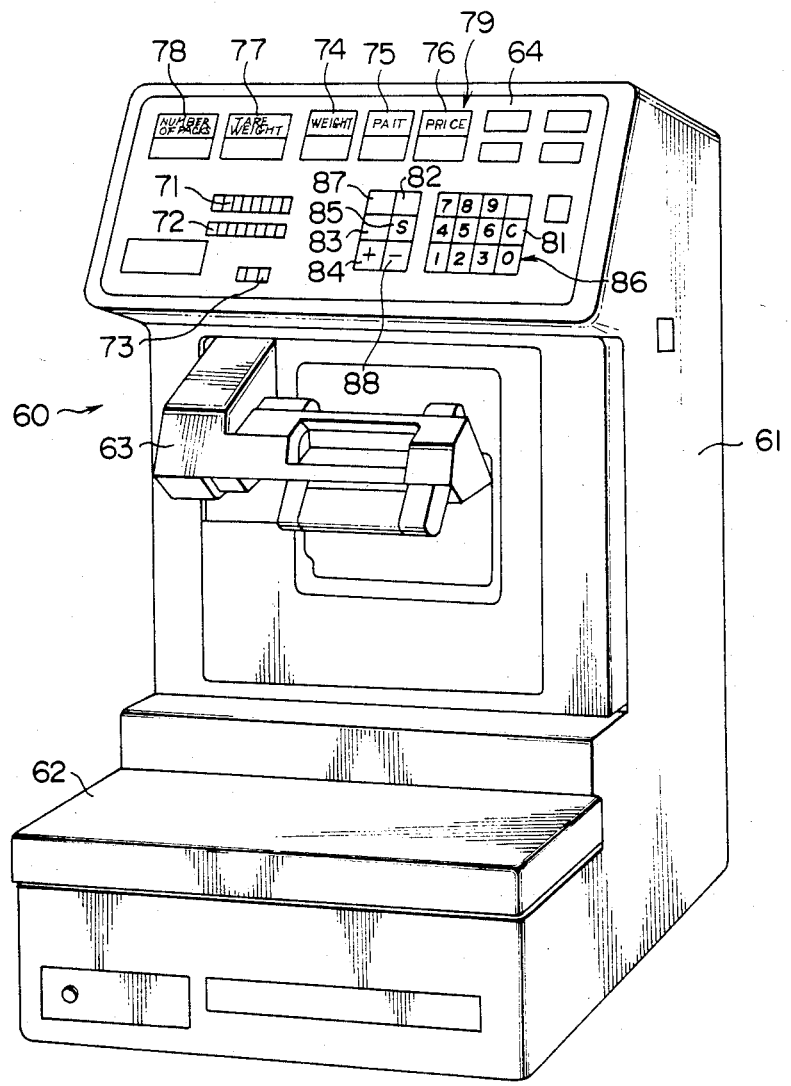
FIG. 34 is a perspective view of a label printer in still another embodiment.
Figure 35:
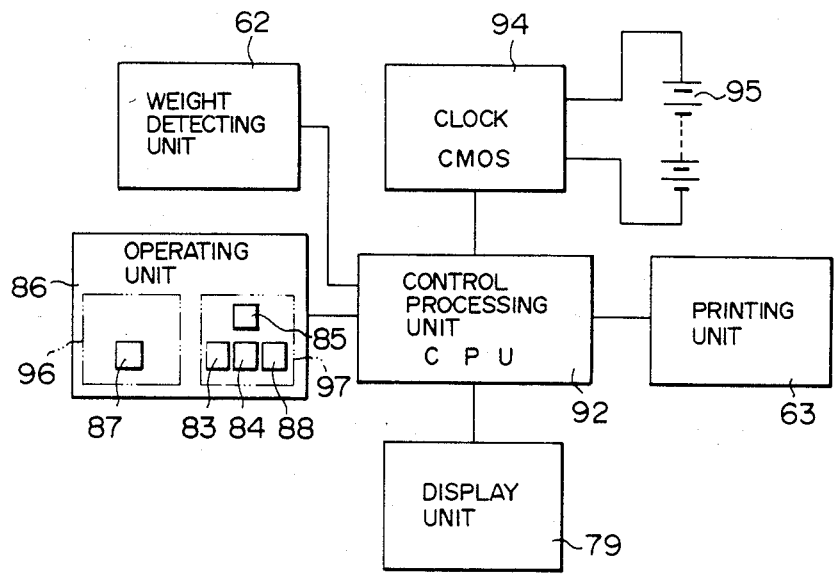
FIG. 35 is a block diagram of the label printer in FIG. 34.
Figure 36:
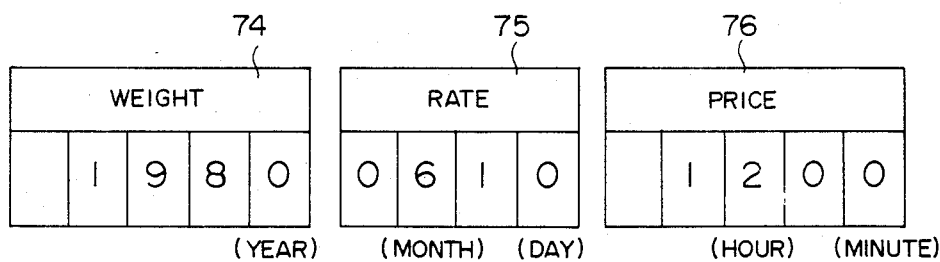
FIG. 36 is a plan view of an example of display field.

Referring to FIGS. 34-36, a label printer having date setting function will be described. FIG. 34 shows external appearance of a label printer 60. The label printer detects weight of articles and issues a label with display of required data such as preparation date and effective data (expiration date) for use in articles. The label printer comprises a body 61 containing electronic circuit and a clock as hereinafter described, a weight detecting unit 62 attached to the body 61 for carrying articles to be weighed, a printing unit 63 issuing a label and applying it to articles carried by the weight detecting unit 62, and a control panel 64 mounted on upper portion of the body 61.

The control panel 64 is provided with a display unit 79 comprising a preparation date display field 71 indicating the preparation date, an effective date display field 72 indicating the effective date (expiration date for edible day in foods), a code display field 73 indicating codes per section, a weight display field 74 indicating weight of article disposed on the weight detecting unit 62, rate, price and accumulated number of issued labels, a rate display field 75, a price display field 76, a tare display field 77 and a display field of number of packs 78. The control panel 64 is also provided with an operation unit 86 comprising number keys 81, a time setting key 82, an edible day setting key 83, an addition key 84, an S key 85, a preparation date setting key 87 and a subtraction key 88.

FIG. 35 shows a block diagram of the label printer 60. Weight of articles disposed on the weight detecting unit 62 is measured using load cell, auto-balance or the like, and the analog signal is converted into digital signal. The digital signal is transmitted to a control unit 92 (central processing unit, micro computer or the like) where data such as weight, price are calculated and stored. Content of stored data is transmitted to the display unit 79 and the printing unit 63 for display and label issue. A clock 94 is connected to the control unit 92 and provided with automatic calendar function. The clock 94 is connected to a storage battery 95 and outputs signals of year, month, day, hour, minute, second, and day of the week to the control unit 92.

The operating unit 86 is connected to the control unit 92 and controls the unit 92. The operating unit 86 comprises a setting means 96 setting the preparation date to the control unit 92 using the number key 81 and the preparation date setting key 87, and a command means 97 making the control unit 92 calculate the effective term from the edible day using the edible day setting key 83 and the number key 81 and making the control unit 92 change the preparation date using the addition key 84 and the subtraction key 88.

Use method of the label printer 60 constituted as above will be described.

When the content of calendar (year, month, day, hour, minute or the like) of the clock 94 is adjusted, the time setting key 82 of the operating unit 86 is pushed and the clock 94 is ready for correction through the operating unit 86. When the time setting key 82 is pushed, the content of calendar is displayed on the weight display field 74, the rate display field 75 and the price display field 76 respectively as shown in FIG. 36. If the content of calendar is not correct, the S key 85 is pushed and a part corresponding to year, month, day, hour, minute shown in FIG. 36 is intermittently flashed and set to "0" by the clear key (c) of the number key 81 and then registered by the number key 81. For example, when year "1980" is set, the S key 85 is pushed once and the weight display field 74 of FIG. 36 is intermittently flashed. When the S key 85 is pushed again, the month indicating portion in two columns of the rate display field 75 is intermittently flashed. When the content of calendar is completely set as shown in FIG. 36 by such sequential setting operation, the time setting key 82 is pushed again and restored in the original state.

In normal state, the content of calendar (signal) of the clock 94 is continuously transmitted to the control unit 92, irrespective of working state of the label printer. If the label printer is in working state, the date is displayed on the preparation date display field 71 and the content is transmitted to the printing unit 63.

When the preparation date is set, the preparation date setting key 87 of the operating unit 86 is pushed and the control unit 92 is in correction ready state. The preparation date, i.e. "year", "month", "day", corresponding to the date, is inputted to the control unit 92 using the number key 81 and displayed in the preparation date display field 71. When the preparation date setting key 87 is pushed again, the setting of the control unit 92 is released.

When the effective date is set, the setting means 96 of the operating unit 86 is operated as follows. The edible day setting key 83 is pushed and the control unit 92 is in correction ready state. The edible day of article is inputted to the control unit 92 using the number key 81. The control unit calculates the effective date by adding the inputted edible day to the preparation date. The effective day is set by the control unit 92 in consideration of change of year or month as follows.

(EXAMPLE 1)

The preparation date in June 10, 1980 and product will be good for 20 days (a) operation of year: 1980, month: 6, day: 10+20 is automatically effected at the control unit 32.

(b) Effective date of year: 1980, month: 6, day: 30 is specified and whether day: 30 is within the last day of June, i.e. 30th day or not is decided.

(c) If the condition is satisfied, 30th day of June 1980 is stored as the effective date to the control unit 92 and displayed in the effective date display field 12.

(EXAMPLE 2)

The preparation date in June 10, 1980 and product will be good for 60 days (a) Operation of year: 1980, month: 6, day: 10+60 is effected at the control unit 32.

(b) Effective date of year: 1980, month: 6, day: 70 is specified and whether day: 70 is within the last day of June, i.e, 30th day or not is decided. Since 70>30, (c) Year: 1980, month: 6+1, day: 70−30 is specified.

(d) In year: 1980, month: 7, day: 40, whether day: 40 is within the last day of July, i.e. 31st day or not is decided. Since 40>31, (e) Year: 1981, month: 7+1, Day: 40−31 is specified.

(f) In year: 1981, month: 8, day: 9, whether day: 9 is within the last day of August, i.e. 31st day or not is decided. Since 9<31, 9th day of August 1980 is stored as the effective date to the control unit 92 and displayed in the effective date display field 72.

(EXAMPLE 3)

The preparation date in Dec. 15, 1980 and edible day in 90 days (a) Operation of year: 1980, month: 12, day: 15+90 is effected at the control unit 92.

(b) In year: 1980, month: 12, day: 105, whether day: 105 is within the last day of December, i.e. 31st day or not is decided. Since 105>31, (c) Year: 1980, month: 12+1, day: 105−31 is specified.

(d) In year: 1980, month: 13, day: 74, since 13>12, "year" "month" are advanced.

(e) Year: 1981, month: 1, day: 74 is specified, and whether day: 74 is within the last day of January, i.e. 31st day or not is decided. Since 74>31, (f) Year: 1981, month: 1+1, day: 74−31 is specified.

(g) In year: 1981, month: 2, day: 43, whether day: 43 is within the last day of February, i.e. 28th day (1981 is common year) or not is decided. Since 43>28, (h) Year: 1981, month: 2+1, day: 43−28 is specified.

(i) In year: 1981, month: 3, day: 15, whether day: 15 is within the last day of March, i.e. 31st-day or not is decided. Since the condition is satisfied, effective date of 15th day of March 1981 is displayed in the effective date display field 79.

As above described, when the edible day is inputted to the control unit 92, the effective date is automatically calculated by the control unit 92 and displayed in the effective date display field 72, and signal is transmitted to the printing unit 63, if necessary.

When a container with the label is prepared and the article is put in the container the next day, that is, when a label with advanced date is required, the addition key 84 is pushed at the setting of the preparation date setting key 87, the preparation date is carried down by the number of days corresponding to the number of times of pushing operation by action of the control unit 92. If the subtraction key 88 is pushed, the preparation date is advanced by setting of the control unit 92. The advanced date is required when filling work of article is transferred to the next day. When the preparation date is changed on the way, the effective date is also corrected automatically.

When the preparation date is set utilizing the clock 94, the time setting in the clock 94 is utilized as the preparation time. Accordingly, if the time setting is carried out first, the date is automatically changed and troublesome work is not required for the date change.

When the effective date is set utilizing the clock 94, the edible day setting key 83 of the operating unit 86 is pushed and the effective date display field 72 is intermittently flashed. If the edible day is inputted to the control unit 92 using the number key 81, the control unit 92 adds the edible day to the preparation date, thereby the effective date is automatically calculated. Even when the date extends to a new month or a new year, the control unit 92 carries out operation corresponding to the preparation date and there is no error. The S key 85 is pushed and the intermittently flashed state is released, thereby the effective date is set.

When the label with advanced date is issued utilizing the clock 94, every push of the addition key 84 of the control unit 86 advances the preparation date by one day therefore the label with advanced date is issued. If the number key 81 is pushed and the addition key 84 is pushed, the advanced date correponding to the number key 81 is obtained. At the end of the label issue with advanced date, the time setting key 82 is operated again and the preparation date is restored to the original state.

In one embodiment shown in FIG. 36, display and printing of "hour" "minute" of the content of calendar is omitted. However, a label giving an impression of accurate quality control may be issued by printing "hour and" "minute". This can be said also regarding "second" "day of the week".

Figure 37:
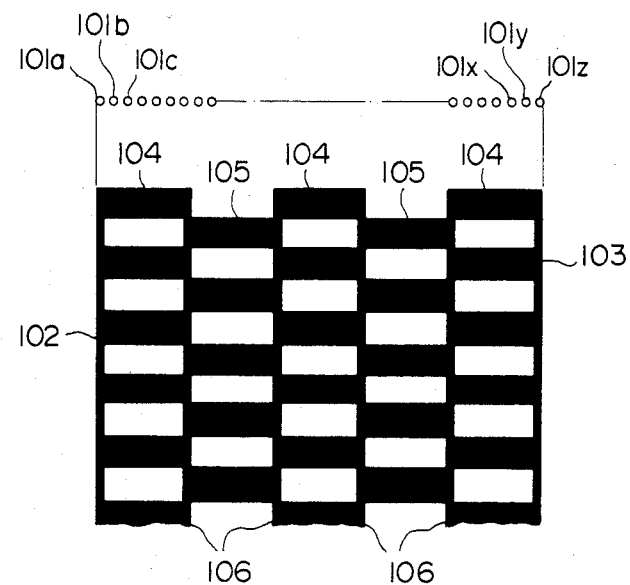
FIGS. 37–39 are plan views of examples of check pattern.
Figure 38:
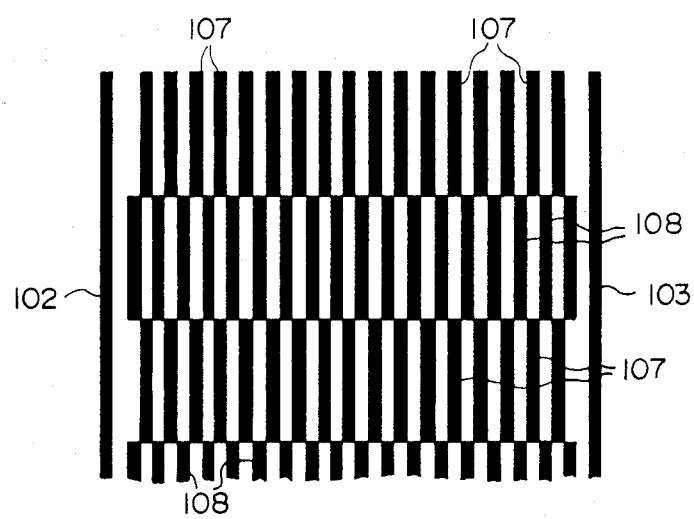
Figure 39:
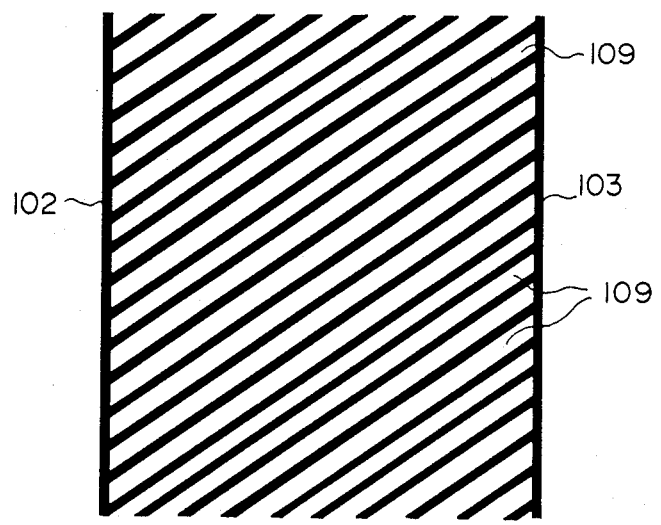

Referring to FIGS. 37–39, method of checking operation of the print head of the label printer will be described. More particularly, the operation of the print head is checked by issue of label with prescribed check pattern printing.

FIG. 37 shows a first example of the check pattern. Numerals 101*a*–101*z* designate a number of print heads for printing with dots. The print heads 101*a*–101*g* are controlled by control circuit such as control system (CPU) installed in the label printer (for example, electric balance with label issue function). Required pattern is programmed and prescribed check pattern is printed on the label. The print heads 101*a*, 101*z* at both side ends is operated continously or intermittently and pattern 102, 103 is printed in a line (including dotted line). The print heads 101*b*–101*y* are operated between pattern 102, 103 alternatively with each other, thereby check pattern 104, 105 with checkered pattern form is printed.

Adjacent portion of check pattern 104, 105 alternately printed is overlapped, thereby overlap pattern 106 parallel to the line pattern 102, 103 is simultaneously printed.

FIG. 38 shows a second example of check pattern. The line pattern 102, 103 is printed and at the same time check pattern 107, 108 of comb teeth form is printed between the pattern 102, 103 by using the residual print heads 101b–101y.

FIG. 39 shows a third example of check pattern. The line pattern 102, 103 is printed and at the same time check pattern 109, . . . of oblique stripe form is printed between the line pattern 102, 103 by using the residual print heads 101b–101y.

When operation of the print heads 101a–101z is checked by printing check pattern as shown in FIGS. 37-39 on the label, the unworked portion of the print head remains non-printed and continuous line of color of the label is represented in the label feed direction (or the print head feed direction). In FIG. 38, interval of adjacent check pattern 107, 107 or check pattern 108, 108 is partly varied, thereby malfunction of corresponding print head can be detected. In both side pattern 102, 103 and overlap pattern 106, it can be determined whether continuous linear printing is effected or not. If both side pattern 102, 103 or overlap pattern 106 is omitted, detecting the wrong operation of the print head 101a, 101z in both sides is difficult even at non-printed state in both side portion.

In the above examples, the print heads 101a, 101z in both sides are continuously operated at one on each side. However, a plurality of heads on each side may be used. The overlap pattern 106 is not restricted to checkered pattern form, but arrangement of block type check pattern shifted obliquely may be used.

Means for checking the malfunction of the print head using the label printed and issued by the label printer will be explained.

Figure 40:
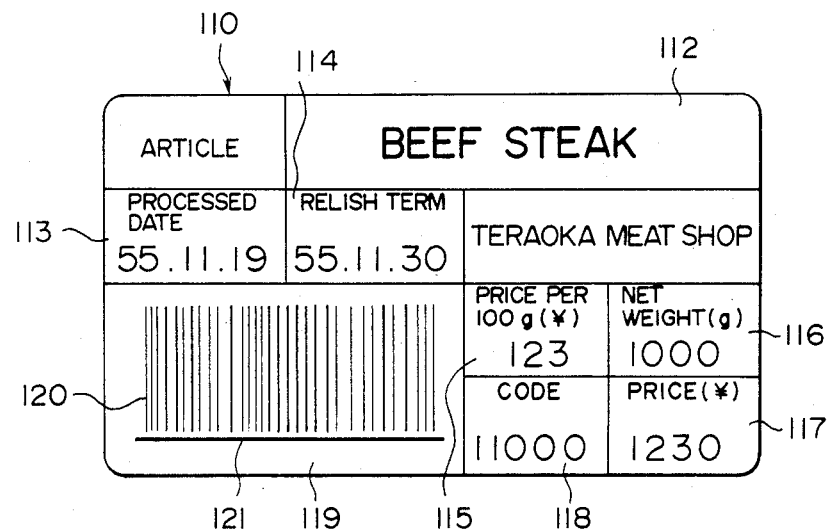
FIG. 40 is a plan view of label with check pattern.

FIG. 40 shows an example of a label 110 issued by the label printer. The background and format of label 110 is previously applied by conventional printing (printing of common parts such as frame, characters of "item", "preparation date", "price") before preparing the label in the label printer. In the label printer using a number of dots arranged in a lateral line, the item field 112 ("BEEF STEAK" in example), the preparation date display field 113 ("55, 11, 19" in example), the edible day display field 114 ("55, 11, 30" in example), the rate display field 115 ("123" in example) and the weight display field 116 ("1000" in example) are printed. The bar code display field 119 is provided on which the bar code 120 in logitudinal lines to be read by the bar code reader, and the check pattern 121, a thick line disposed below the bar code 120 and having width (lateral dimention) larger than display width of the bar code 120 (lateral width in figure) are displayed.

In the label 110, since the bar code 120 as well as the check pattern 121 are printed, if one or a plurality of print heads to print the bar code 126 are malfunctioning for some reason and printing is not effected, the portion of the check pattern 121 corresponding to the malfunctioning print heads will remain the color of the label 110 and the check pattern 121 printed in thick line will be partly cut away, thereby the print heads corresponding to that portion is readily identified. Width dimension of the check pattern 121 is larger than that of the bar code 120, thereby the check pattern 121 in FIG. 40 can normally check the whole bar code 120 and part of the preparation date display field 113, the edible day display field 114 and the item field 112.

Figure 41:
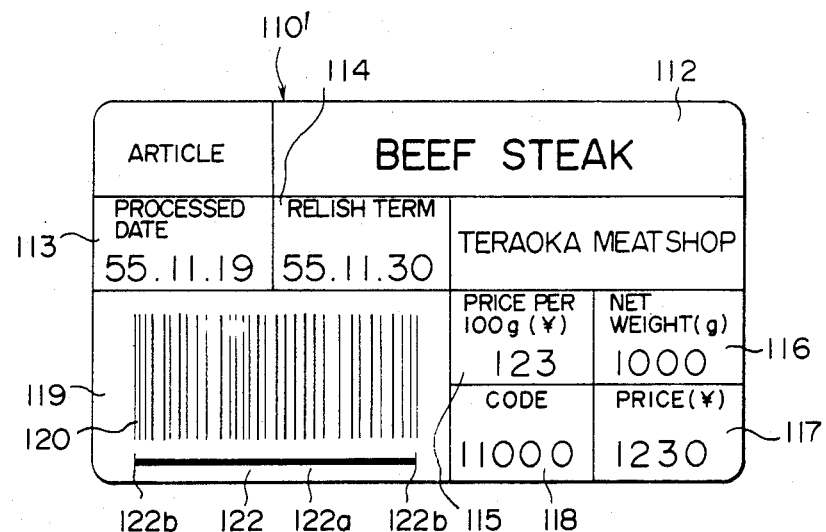
FIG. 41 is a plan view of modified example of label.

FIG. 41 shows a label 110' in modified example of FIG. 40. In the label 110', a check pattern 122 is displayed below the bar code 120 and has a width dimension equal to that of the bar code 120. The check pattern 122 is composed of thick line 122a in parallel to width direction and short perpendicular line 122b connected to both ends of the thick line 122a. When the bar code 120 have width dimention as long as that of the check pattern 122, or when one end of the check pattern 122 is printed using one side end portion of the print head, checking is effected using the thick line 122a in similar manner to FIG. 40 and at the same time the corresponding print head is checked using the perpendicular line 122b (If the perpendicular line is not printed, decision is difficult when the print head in one end does not act).

In the example of FIG. 40 and FIG. 41, the check pattern 121 or 122 is printed near (below) the bar code 120. However, the check pattern 121 or 122 may be printed to any portion where check of printing range is required (for example, full-range, portion for printing of numerals, portion for printing of characters), or all characters, frame, numerals, or symbols may be printed on the label using the line printer and utilized as check pattern.

Figure 42:
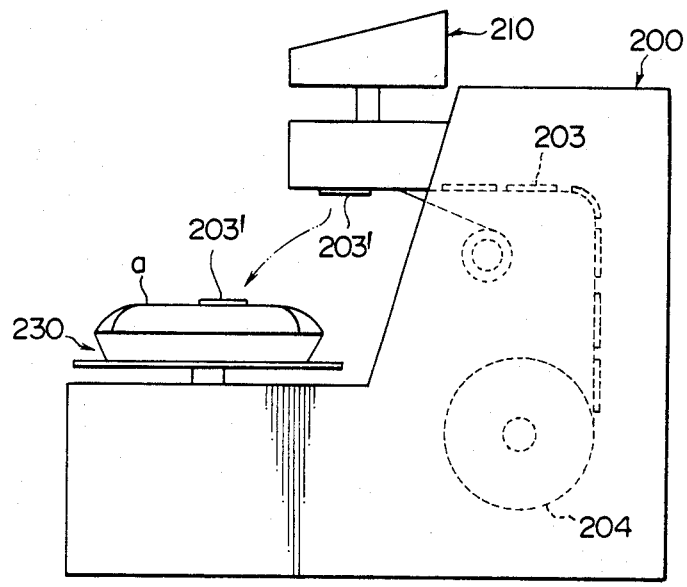
FIG. 42 is a side view of a label printer in still another embodiment.
Figure 43:
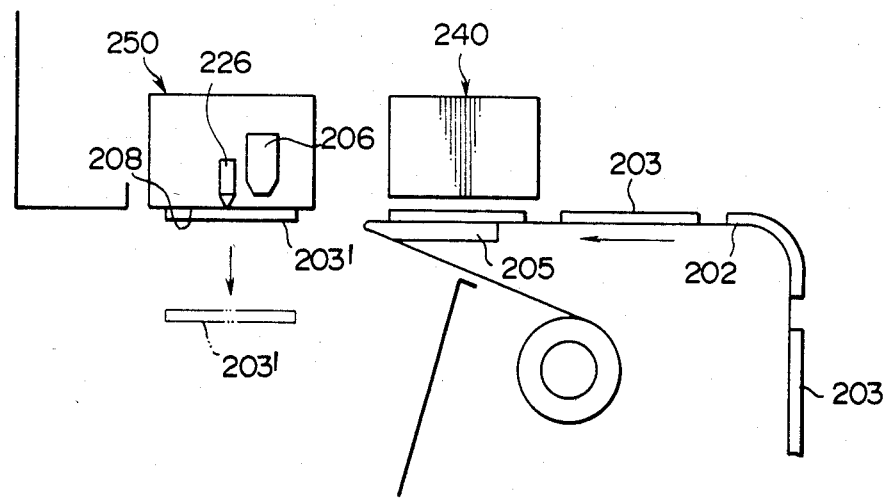
FIG. 43 is an enlarged sectional view of the issue label feeding portion.
Figure 44:
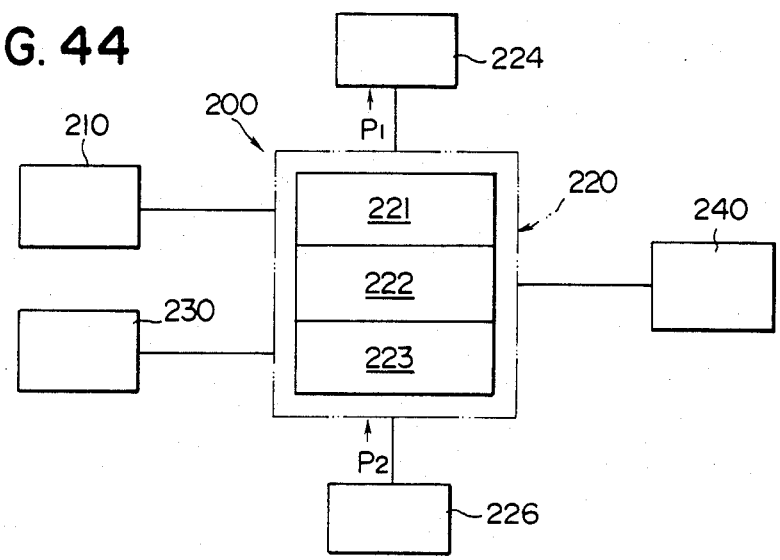
FIG. 44 is a block diagram illustrating constitution of the label printer.

Referring to FIGS. 42–44, improvement of a label printer will be described, wherein the label printer contains an accumulating memory accumulating data required for the issued label in sequence and storing the accumulated data.

The label printer 200 shown in FIG. 42 and FIG. 43 comprises an input operating unit 210, a weight detecting unit 230, a label printing unit 240 and a label holder 250. A control system 220 shown in FIG. 24 controls operation of above mentioned units. An accumulating memory 224 is connected or installed to the control system 220.

The control system 220 is composed of a memory unit 221 storing the required data such as weight data inputted from the weight detecting unit 230, price data and character name from the input operating unit 210 until the data printing, of a control unit 222 outputting the printing command and memory adding command $P_1$ according to input signals to the label printing unit 240 and the accumulating memory 224 for prescribed working in good time, and of an operation processing unit 223 processing input signals from the weight detecting unit 230 and the operating unit 210. The control system 220 is integral with the input operating unit 210 disposed above the label printer 200.

The label printing unit 240 prints article name, item code, rate, preparation date, effective date, bar code data, weight, price or the like, of article (a) carried by the weight detecting unit 230 on labels 203 spaced at regular intervals and removably adhered to a support paper 202 according to printing command from the control system 220.

The labels 203 are fed in intermittent operation from a roll 204 using a feeding device (not shown). After being printed by the printing unit 240, the labels 203 are removed from the label support paper 202 when the support paper 202 turns at a dispenser 205.

The label holder 250 is disposed forwards in the label feed direction near the printing unit 240. The bottom surface of the label holder 250 is provided with a suction hole normally sucking by means of negative pressure of a fan and a sticking surface 208 which holds the issued label 203'.

A label detector 226 mounted to the label holder 250 optically detects removal of the issued label 203' which is normally stuck and held to the sticking surface of the label holder 250, and the detecting signal $P_2$ is outputted to the control system 230.

The accumulating memory 224 stores total weight, summed price, total number of pieces of article (a) per item according to memory adding command $P_1$ from the control system 220.

The label printer 200 inputs required data by keying operation, and after weight of article (a) is weighed by the weight detecting unit 230, rate, weight, price or the like are indicated to the display unit of the input operating unit and printed to the label 203. If the issued label 203' is removed from the label holder 250 by manual operation, the label detector 226 outputs the detecting signal $P_2$ to the control system 220. On receiving the detecting signal $P_2$, the control system 220 outputs the memory adding command $P_1$ and the accumulating memory 224 carries out adding operation and stores required data of the article (a).

If the label 203' is printed and not held to the label holder 250 on account of label misfeed, the label detector 226 does not output the detecting signal $P_2$ and the memory adding operation of the accumulating memory 224 is not effected.

When a label 203' with erroneous data is issued on account of wrong operation of keys, when the label 203' is issued but corresponding article (a) is inferior, or when the label 203' stuck and held to the label holder 250 is broken, the accumulating memory 224 is set to non-addition state by operating non-addition key so that the detecting signal $P_2$ is not outputted from the label detector 226 at removing the label 203', and then the issued label 203' is removed and the label 203' is reissued.

Reference numeral 206 designates a nozzle which jets air downwards by a force greater than the suction force in the sticking surface 208. On receiving the label adhesion command from the control unit 222, the nozzle 206 acts so that the issued label 203' held to the holder 250 is automatically adhered to article (a).

In the label printer 200, required data is added and stored to the accumulating memory by removing the issued label fed from the printing unit. Even if the label is issued with erroneous data on account of wrong operation in the input operating unit, the erroneous data is not stored to the accumulating memory. Therefore the correcting operation of the accumulating memory is unnecessary and accuracy of the accumulation is improved.

Figure 45:
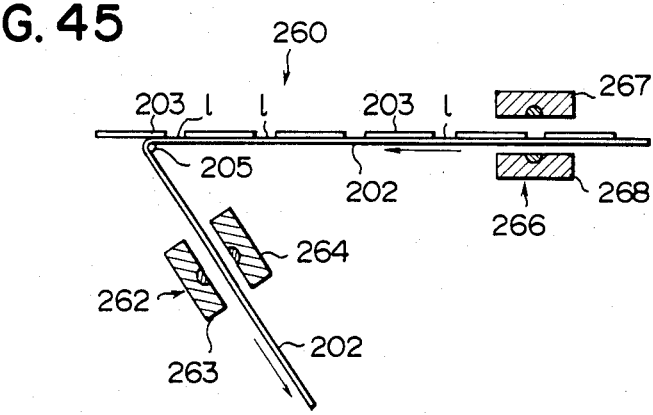
FIG. 45 is a side view of the label position detecting system.
Figure 46:
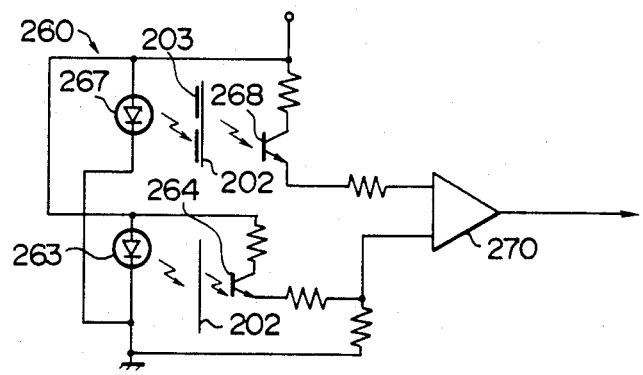
FIG. 46 is a circuit diagram of the detecting system in FIG. 45.

FIG. 45 shows a label position detecting system 260 in the label printing unit 240, and FIG. 46 shows a circuit diagram thereof. Reference numeral 262 designates a support paper detector, 266 a label detector, and 270 a comparator. The support paper detector 262 comprises a light emitting element 263 and a light receiving element 264. The detector 262 is disposed at a position where only the support paper 202 passes, that is, where the support paper 202 passes after removing the label 203 at the dispenser 205.

More specifically, the light emitting element 263 and the light receiving element 264 are opposed with respect to the support paper after removing the label 203 so that light from the emitting element 263 always passes through the support paper and is received by the receiving element 264. The receiving element 264 and the comparator 270 are connected so that output voltage of the receiving element 264 receiving light from the emitting element 263 is inputted as reference voltage to the comparator 270.

When the label is adhered to the support paper and margin remains along both edges of the support paper, the support paper detector may be disposed at the margin. In this case, the support paper detector and the label detector may be integral with each other.

The label detector 266 comprises a light emitting element 267 and a light receiving element 268, and is disposed at a position where each label 203 adhered to the support paper 202 passes.

More specifically, the light emitting element 267 and the light receiving element 268 are opposed with respect to the support paper 202 having the label 203 adhered thereon so that light from the emitting element 267 is projected either onto the label 203 or onto the adhesion gap (l) between labels 203. As the label 203 is transferred, light passes through the label 203 and the support paper 202 and is received by the receiving element 268 when it is projected onto the label 203, and light passes through the support paper 202 only and is received when it is projected to the adhesion gap (l). The receiving element 268 and the comparator 270 are connected so that output voltage of the receiving element 268 receiving light from the emitting element 267 is inputted to the comparator 270. Both light emitting elements 263 and 267 are connected in parallel so that equal voltage is supplied. In addition, both emitting elements 263, 267 and receiving elements 264, 268 are preferably in the same rating respectively.

The comparator 270 compares the output voltage of the support paper detector 262 as reference voltage with the output voltage of the label detector 266 as comparing input voltage and outputs a prescribed operating voltage when input voltage is beyond reference voltage.

When the support paper detector 262 and the label detector 266 in circuit as in FIG. 46 are disposed to a prescribed position with regard to the support paper 202 on which the labels 203 are adhered at regular intervals as shown in FIG. 45, and the support paper 202 is moved in the longitudinal direction and the labels 203 are fed, reference voltage obtained from the support paper detector 262 becomes constant output voltage $V_1$ of the receiving element 264 receiving the light which is projected from the emitting element 263 at application of power source Vcc and passes through the support paper 202. Input voltage to the comparator 270 obtained from the label detector 266 comprises output voltage $V_2$ produced when the label detector 266 detects the gap (l) between labels. Output voltage $V_2$, which is produced when detecting conditions such as power source Vcc is applied to the light emitting element 267, projecting energy through the support paper 202 for light passing, the receiving element 268 are the same as the support paper detector 262, and which is prescribed higher than $V_1$ by means of resistor division or the like, output voltage $V_2$, is produced when the label detector 266 detects the label 203, that is, output voltage $V_2'$ which is produced when light from the emitting element 267 passes through the label 203 and the support paper 202 and is received by the receiving element 268, and which is lower than output voltage $V_1$ or $V_2$, said output voltage $V_2$ and $V_2'$ being alternately produced to constitute voltage in pulse form. When input voltage is higher than reference voltage, that is, when the label detector 266 detects the adhesion gap (l), the comparator 270 outputs the operating voltage.

When the support paper 202 is exchanged by other support paper 202 different in thickness and/or permeability, output voltage $V_1$ of the support paper detector 262 as reference voltage and output voltage $V_2$, $V_2'$ of the label detector 266 as input voltage are respectively changed from that in original support paper 202. However, reference voltage and output voltage $V_2$ are the same in condition of change, therefore output voltage $V_2$ becomes higher than reference voltage by a prescribed value, and output voltage $V_2'$ becomes lower than reference voltage by a prescribed value. When the label detector 266 detects the adhesion gap (l), the comparator 270 outputs the operating voltage in similar manner.

Accordingly, when the operating voltage is outputted from the comparator, it is known that the adhesion gap (l) of the label 203 is in detecting position of the label detector 266, thereby position of the label 203 is identified.

In the label printing unit 240, reference voltage is automatically set even if the support paper with the labels adhered thereon is changed in thickness and permeability. Disadvantages of conventional label position detecting device in that when the support paper is changed the reference voltage must be changed is eliminated.

Accordingly, production of inferior label caused by failure of setting of reference voltage or trouble in the printer can be prevented, and workability of the printer can be improved.

I claim:

1. A label comprising a substrate and on which a bar code has been printed by a dot printer with a printing head having a line of printing elements arranged in a first direction, the label and printing head being moved relatively in a second direction while the elements are selectively activated thereby to print on the label at least a portion of printing extending in the first direction, wherein the label further comprises a check pattern thereon created by the printing elements which extends in said first direction to at least the same extent as said portion of printing and also extends in said second direction, said check pattern indicating if any of said elements is not working by an unprinted line extending in the second direction in said check pattern.

2. A label according to claim 1, wherein the width of said check pattern is greater than the width of said portion of printing.

3. A label comprising a substrate and having a check pattern and indicia printed thereon, said check pattern and a portion of said indicia being printed on the label by printing elements of a dot type printer over a printing range, wherein said check pattern has a regular shape and has a width dimension equal to or greater than the range of said portion to be printed on the label by the dot type printer and wherein said check pattern is printed spaced from said portion, said portion requiring a check of the printing elements within the printing range and said check pattern extending over the width of the printing range, and said check pattern indicating if any of the elements are not working by a break in the regular shape.

4. A label according to claim 3, wherein said portion is a bar code display and said check pattern comprises a thick line.

5. A label according to claim 3, wherein said portion is a bar code display and said check pattern is composed of a thick line and a short perpendicular line connected to each end of said thick line.

6. A label according to claim 3, wherein said check pattern serves as a frame portion printed on the label.

7. A label according to claim 3, wherein said check pattern comprises a thick line.

8. A label having a check pattern according to claim 3, wherein said check pattern comprises a line and a short perpendicular line at each end of said line.

9. A label according to claim 3, wherein said check pattern includes short lines perpendicular to said width dimension.

10. A label according to claim 3, wherein the dot type printer printing said portion and said check pattern is a thermal printer, and said indicia portion and said check pattern comprise a chemical change in said substrate.

11. A label according to claim 3, wherein the dot type printer printing said portion and said check pattern is a wire dot printer, and said indicia portion and said check pattern are printed with ink on said substrate.

* * * * *